United States Patent
Ishii et al.

(10) Patent No.: US 9,497,693 B2
(45) Date of Patent: Nov. 15, 2016

(54) EXTENSION CARRIER DISCOVERY FOR CARRIER AGGREGATION

(75) Inventors: Hiroyuki Ishii, Palo Alto, CA (US); Yoshihisa Kishiyama, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 223 days.

(21) Appl. No.: 14/344,989

(22) PCT Filed: Sep. 14, 2012

(86) PCT No.: PCT/US2012/055616
§ 371 (c)(1),
(2), (4) Date: Jul. 16, 2014

(87) PCT Pub. No.: WO2013/040487
PCT Pub. Date: Mar. 21, 2013

(65) Prior Publication Data
US 2015/0003348 A1 Jan. 1, 2015

Related U.S. Application Data

(60) Provisional application No. 61/561,651, filed on Nov. 18, 2011, provisional application No. 61/556,611, (Continued)

(51) Int. Cl.
| | |
|---|---|
| H04W 4/00 | (2009.01) |
| H04L 12/28 | (2006.01) |
| H04W 36/00 | (2009.01) |
| H04W 48/16 | (2009.01) |
| H04L 5/00 | (2006.01) |

(Continued)

(52) U.S. Cl.
CPC ........... *H04W 48/16* (2013.01); *H04L 1/20* (2013.01); *H04L 5/001* (2013.01); *H04L 5/0048* (2013.01); *H04L 27/2601* (2013.01); *H04W 48/12* (2013.01); *H04W 72/0453* (2013.01); *H04L 5/0016* (2013.01); *H04W 84/045* (2013.01); *H04W 88/085* (2013.01)

(58) Field of Classification Search
CPC ............... H04B 1/713; H04J 11/0069; H04L 5/0048; H04L 5/0064; H04W 56/001; H04W 48/16
See application file for complete search history.

(56) References Cited

U.S. PATENT DOCUMENTS

| | | | |
|---|---|---|---|
| 2008/0095108 A1* | 4/2008 | Malladi ................. | H04B 1/713 370/329 |
| 2009/0129341 A1* | 5/2009 | Balasubramanian | H04W 36/0055 370/331 |
| 2010/0203890 A1* | 8/2010 | Nagaraja .......... | H04W 36/0061 455/436 |

FOREIGN PATENT DOCUMENTS

| | | |
|---|---|---|
| WO | 2010/093645 A1 | 8/2010 |

OTHER PUBLICATIONS

Extended European Search Report in counterpart European Application No. 12 83 0967.1 issued May 4, 2015 (6 pages).
(Continued)

*Primary Examiner* — Melanie Jagannathan
(74) *Attorney, Agent, or Firm* — Osha Liang LLP

(57) ABSTRACT

Two alternative embodiments are disclosed to enable a user equipment to efficiently discover small cells using a secondary carrier. The user equipment has a primary carrier link to a base station. In addition, the user equipment has a secondary carrier link to a network node in a small cell within a macro cell supported by the base station. The small cells are discovered through novel beacon signals or through modified PSS/SSS transmissions.

26 Claims, 28 Drawing Sheets

Related U.S. Application Data filed on Nov. 7, 2011, provisional application No. 61/535,424, filed on Sep. 16, 2011.

(51) Int. Cl.

| | | |
|---|---|---|
| *H04L 1/20* | (2006.01) | |
| *H04W 48/12* | (2009.01) | |
| *H04L 27/26* | (2006.01) | |
| *H04W 72/04* | (2009.01) | |
| *H04W 84/04* | (2009.01) | |
| *H04W 88/08* | (2009.01) | |

(56) References Cited

OTHER PUBLICATIONS

Office Action in counterpart European Patent Application No. 12 830 967.1 issued on Sep. 14, 2016 (5 pages).
Office Action in counterpart Japanese Patent Application No. 2014-530902 issued on Sep. 6, 2016 (11 pages).
Pantech; "Multiple TA for CA with RRH and repeater"; 3GPP TSG RAN WG1 Meeting #66, R1-112695; Athens, Greece; Aug. 22-26, 2011 (8 pages).

\* cited by examiner

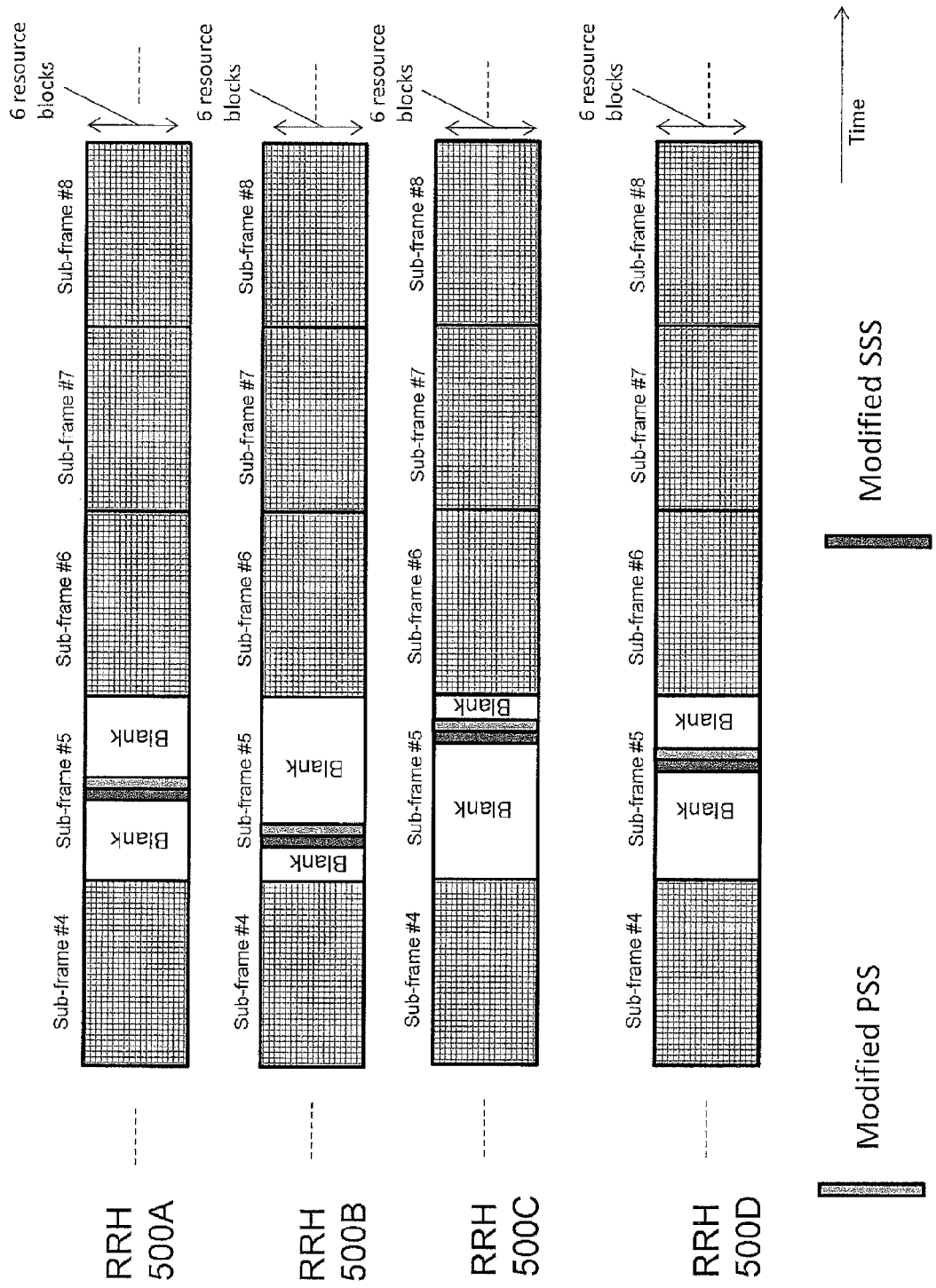

FIGURE 17

| # | Physical Cell ID | Cell individual Offset | Transmission timing of Modified PSS/SSS | |
|---|---|---|---|---|
| 0 | 8 | 0 | OFDM symbols #5, 6 | ← RRH 500A |
| 1 | 1 | 0 | OFDM symbols #1, 2 | ← RRH 500B |
| 2 | 6 | 0 | OFDM symbols #12, 13 | ← RRH 500C |
| 3 | 3 | +3 | OFDM symbols #9, 10 | ← RRH 500D |

FIGURE 18

| Physical Cell ID | Transmission timing of Modified PSS/SSS | |
|---|---|---|
| 0 | OFDM symbols #5, 6 | ← RRH 500B |
| 1 | OFDM symbols #1, 2 | |
| 2 | OFDM symbols #12, 13 | |
| 3 | OFDM symbols #9, 10 | ← RRH 500D |
| 4 | OFDM symbols #5, 6 | |
| 5 | OFDM symbols #1, 2 | |
| 6 | OFDM symbols #12, 13 | ← RRH 500C |
| 7 | OFDM symbols #9, 10 | |
| 8 | OFDM symbols #5, 6 | ← RRH 500A |
| ... | ... | |

FIGURE 19

$(Transmission\ timing\ index) = (Physical\ cell\ ID)\ mod\ 4$

Note: The function of "X mod Y" computes the reminder of dividing X by Y.

| Transmission timing index | OFDM symbol index where Modified PSS/SSS are transmitted |
|---|---|
| 0 | OFDM symbols #5, 6 |
| 1 | OFDM symbols #1, 2 |
| 2 | OFDM symbols #12, 13 |
| 3 | OFDM symbols #9, 10 |

EXTENSION CARRIER DISCOVERY FOR CARRIER AGGREGATION

RELATED APPLICATION

This application claims the benefit of: U.S. Provisional Application No. 61/535,424, filed Sep. 16, 2011, U.S. Provisional Application No. 61/556,611, filed Nov. 7, 2011, and U.S. Provisional Application No. 61/561,651, filed Nov. 18, 2011. The contents of these applications are hereby incorporated by reference in their entirety.

TECHNICAL FIELD

This matter relates to carrier aggregation, and more particularly to balancing the conflicting demands of mobility performance and power consumption in a user equipment through novel cell discovery techniques.

BACKGROUND

The Long Term Evolution (LTE) communication system is a successor to the Wideband Code Division Multiple Access (WCDMA) and High Speed Downlink Packet Access (HSDPA) systems. In an LTE system, Orthogonal Frequency Division Multiple Access (OFDMA) is used in downlink whereas Single-Carrier Frequency Division Multiple Access (SC-FDMA) is used in uplink. SC-FDMA is closely related to OFDMA and was chosen for uplink to provide a lower peak-to-average power ratio. Such a ratio is not as important in downlink and thus OFDMA is suitable for downlink.

OFDMA is advantageous in that it enables the high data rates that are envisioned for 4G systems. To better appreciate its advantages, consider the case if data is sent in a serial fashion. In a serial data stream, each data symbol must occupy a relatively brief timespan so as to achieve the desired high data rate. For example, if a system is to achieve 100 Mbps and the data is sent serially, each binary data symbol would have a period of just 0.01 µs. If the channel were perfect, such a symbol length would be no problem. But the channel for real-world cellular communication systems is far from perfect: there are lots of buildings, structures, and other obstacles that reflect the signal and introduce multipath. In a multipath channel, various delayed versions of the signal are received in addition to any un-reflected signal. These delayed versions cause inter-symbol interference (ISI) in the receiver that makes serial communication problematic. But OFDMA modulates a high-speed serial data stream onto a parallel stream of various subcarriers. Each subcarrier has a relatively slow data rate, which mitigates the ISI. Moreover, the subcarriers are readily produced through Fourier transform processes. Thus, a handset need have just a single oscillator to produce all the required subcarriers, which eases production costs. Because OFDMA enables robust high-speed and spectrally efficient data transmission at relatively low cost, older technologies such as CDMA are being rapidly phased out in favor of OFDMA systems such as LTE.

Although LTE is advantageous as compared to older technologies, it still faces numerous technical challenges. For example, the desired downlink data rate for LTE is 100 Mbps. Although this is technically possible, it is difficult to achieve in the challenging real-world channel that cellular communications must operate in. For example, if the channel is particularly problematic, the LTE coding rate is reduced accordingly. Thus the LTE goal of 100 Mbps remains largely theoretical in many environments.

Another impediment to high-speed data rates in LTE is the channel bandwidth: although the channel can be made smaller, 20 MHz is the maximum single channel bandwidth under the LTE standard for any given carrier. In LTE, each subcarrier is separated by 15 KHz from adjacent subcarriers. Thus, any given amount of bandwidth can only accommodate so many subcarriers. In LTE the subcarriers are arranged in resource blocks. A 20 MHz channel can thus accommodate only 100 resource blocks. If the channel conditions are such that the subcarriers in each resource block are modulated at a relatively low coding rate, then there is only so much data that can be sent through a 20 MHz channel. In contrast, higher data rates can be achieved with higher coding rates such as 64 QAM. But a handset cannot readily decode 64 QAM unless the channel is of good quality. It is thus often the case that LTE data rate goals cannot be achieved even using the maximum 20 MHz channel bandwidth.

Carrier aggregation allows a communication system such as an LTE system to get around this bandwidth bottleneck. In carrier aggregation, the user equipment may receive (or may transmit) data on multiple carriers. Each carrier is referred to as a component carrier. For example, a base station could use 5 component carriers to provide five 20 MHz channels between it and the handset. Although carrier aggregation thus greatly aids in achieving high data rates, it comes with assorted technical challenges as well. By and large, the data demands for given handset are such that carrier aggregation is not necessary. It is only during periods win which a user equipment is running a data-hungry application such as downloading high-definition video that carrier aggregation becomes necessary. Thus, it is conventional for a user equipment to communicate only on a single carrier with the base station during periods of normal (not excessive) data demands. This single carrier may be designated as the primary component carrier. If the user equipment is to then switch to carrier aggregation operation, the additional secondary component carriers must first be discovered. Each secondary component carrier may also be denoted as an "extension carrier" in that the bandwidth is being extended through carrier aggregation. Alternatively, the secondary component carriers may be denoted as "inter-frequency carriers" in that they are of different frequencies as compared to the primary component carrier.

To better appreciate the problems faced by a handset in discovering the secondary component carrier(s), the discovery required for conventional handoff may first be discussed. If a user equipment (UE) corresponds to a mobile user that is moving away from the serving base station to a neighboring one, that UE should be able to discover this neighboring base station so that a handoff decision can be made. Generally, this handoff decision is based on the received signal quality at the UE. As the UE gets closer to a neighboring base station and farther away from the serving base station, there will be a point when the signals from the neighboring base station are of better quality than those received from the serving base station. When this signal quality difference is deemed sufficient, the UE should be handed off to the neighboring base station. The neighboring base station thus becomes the serving base station pursuant to the handoff.

For example, an Event A3 is defined as a measurement event in TS 36.331, V10.2.0, 2011-06 regarding such a handoff decision. In LTE, hysteresis is used to minimize "ping-ponging" (repeated handing off back and forth with regard to a pair of base stations). The UE makes a radio link quality (RLQ) measurement of the neighboring base station as well as an RLQ measurement for the serving base station. A decision to handoff the UE to the neighbor cell if:

$$RLQ_{Neighbor} - \text{Hysteresis} > RLQ_{Serving}$$

where $RLQ_{neighbor}$ is the radio link quality of a neighbor cell and $RLQS_{erving}$ is the radio link quality of the serving cell. This handoff decision can be made by the serving base station based upon the RLQ measurements by the UE.

The radio link quality measurements may be based on the Reference Signal Received Power (RSRP) or the Reference Signal Received Quality (RSRQ), both of which are defined in TS 36.214, V10.1.0, 2011-03. In general, both RSRP and RSRQ measurements are conducted based on received common reference signals. The RSRP/RSRQ measurements may be simply denoted as "measurements." Alternatively, a combination of the RSRP/RSRQ measurements and a cell search may be denoted as "measurements."

In LTE, the user equipment makes RSRP or RSRQ measurements for the serving cell and for identified neighbor cells once every 40 ms, for example. The periodicity of the RSRP or RSRQ measurements can depend upon the particular user equipment being implemented. It may also depend on whether the user equipment is in a Discontinuous Reception (DRX) state or in a no-DRX state.

Furthermore, the user equipment needs to continuously conduct cell search for yet-unidentified cells, in addition to RSRP or RSRQ measurements for the identified neighbor cells. The user equipment conducts the search for new cells utilizing the primary synchronization signals (PSS)/secondary synchronization signals (SSS), which are transmitted once per 5 ms. Periodicity of the cell search is dependent upon the particular UE implementation and may also depend on whether the user equipment is in DRX state or in no-DRX state.

The periodicity of the measurements and associated cell search greatly affects battery power consumption in the user equipment. On the one hand, mobility is enhanced if the user equipment conducts cell search and measurements very frequently but this mobility enhancement comes at the cost of increased power consumption, which is problematic for battery-powered devices. On the other hand, power consumption may be reduced if the user equipment conducts cell search and measurements relatively infrequently but this power consumption advantage comes at the cost of reduced mobility performance. A tradeoff must thus be made to balance mobility performance and power consumption.

These same concerns are aggravated if the user equipment is to have carrier aggregation functions. In such a case, the user equipment needs to make cell search/measurements not only for intra-frequency carrier corresponding to neighbor cells, but also for secondary component carriers. In general, cell search/measurements for the inter-frequency or inter-Radio Access Technology (RAT) carrier may need more power consumption than those for the intra-frequency carrier.

Furthermore, there are other issues with cell search and measurement based on PSS/SSS/CRS. If the PSS/SSS transmitted for one cell collides with the same signals transmitted by another cell terms of time and frequency domain resources, these signals interfere with each other if they are not coded orthogonally with respect to each other. Therefore, if a user equipment needs to make measurements for multiple cells having relatively strong and colliding PSS/SSS signals, the signal-to-interference ratio (SIR) for each cell is degraded due to the resulting interference, and the cell search/measurement performance is deteriorated. This kind of problem may be denoted as "pilot pollution." Cell search and measurements for the low SIR cells resulting from this pilot pollution require more power consumption due to the need for greater search and integration times.

It can thus be readily appreciated that the problems with cell search and measurement are exacerbated if carrier aggregation is being practiced. Accordingly, there is a need in the art for improved discovery techniques for secondary carriers.

SUMMARY

As mentioned above, a good trade-off between mobility performance and power consumption/battery life is required in the cell search and measurements in a radio communication system. As the number of secondary component carriers to be discovered increases in a carrier aggregation system, such a trade-off becomes more important. Furthermore, such a trade-off also depends upon the way the discovery technique for the secondary component carriers such as whether conventional synchronization and reference signals are required.

To achieve this satisfactory tradeoff, two novel discovery techniques for secondary component carriers are disclosed herein. In a first embodiment, a new beacon signal is introduced that provides an advantageous balance between mobility performance and power consumption. This beacon signal is carried by the secondary component carrier but is time synchronized with the primary component carrier or other reference carrier. Since the beacon signal transmissions are time synchronized with the primary component carrier, the user equipment can omit the conventional cell search. In this fashion, the user equipment can identify neighbor cells with just one attempt or just a few attempts of receiving the beacon signals. If the beacon signal has a cyclic prefix, the time synchronization with the primary component carrier need not be too precise. For example, the secondary carrier may be transmitted by a network node removed from the base station such as through a remote radio head (RRH). Even if the RRH is time synchronized with the primary carrier, the different propagation delays between the user equipment (UE) and the base station/RRH causes the secondary carrier to be received at the UE offset in time with regard to the primary component carrier time framing. But so long as this delay is within the cyclic prefix period, such a lack of perfect synchronization is harmless. Moreover, the UE may be informed by the base station of the timing offset so that the UE can adjust its reception accordingly. In this fashion, the UE need not hunt for the beacon signal but can identify it within just a few attempts or less. As a result, the power consumptions for cell identification can be reduced.

Furthermore, the discovery measurement rate or frequency by the UE for the secondary component carrier can also be reduced to further limit power consumption. Because of the time synchronization with the reference carrier, no degradation may be observed if the reference carrier mobility performance is maintained. In particular, no degradation in mobility performance occurs even as the measurement rate is decreased if the mobile speed is not high. For example, performance requirements in a DRX system are specified in TS 36.133, V10.3.0, 2011-06 based on assumptions that the user equipment makes measurements once per every DRX cycle, even if the maximum value of the DRX cycle is 2.56 seconds. It can thus be expected that the measurement for the novel beacon signal disclosed herein may be reduced to once every 2.56 seconds yet still achieve satisfactory mobility performance in a low mobile speed scenario.

In another embodiment, pilot pollution problems are addressed despite the use of synchronization signals in the secondary carriers. In this second embodiment, the synchronization signals such as the primary synchronization signal (PSS) and the secondary synchronization signal (SSS) are modified with regard to conventional PSS/SSS signals. In conventional LTE, the PSS/SSS signals are generated in specific subframes. However, the modified PSS/SSS signals disclosed herein involve a cell specific timing for each cell that must be discovered. For example, the serving base station may notify the UE regarding the undiscovered cells' synchronization schedules. A first neighbor cell would transmit according to its assigned timing, a second neighbor cell would transmit according to its assigned timing, and so on. Because the UE has been informed of the various PSS/PSS timing offsets, it can readily discover the synchronization signals.

The serving cell can notify the user equipment of the transmission timing of PSS/SSS for each cell using control signals in the primary carrier transmitted to the UE. These transmission timings are preferably all non-interfering such that the synchronization signals transmitted in the secondary carrier by one cell do not collide with the synchronization signals for another cell. In this fashion, the pilot pollution problems can be avoided for PSS/SSS. As a result, the user equipment can conduct cell search in the secondary carrier in high signal-to-interference (SIR) conditions, and therefore quickly identify cells yet have low power consumption.

Specifically, the user equipment can ignore inter-cell interference for the cell identification in the secondary carrier, and therefore the user equipment can avoid trying to conduct cell identification operations for lower SIR cells. As a result, the user equipment can significantly reduce time for the cell identification in the secondary carrier and thus save battery consumption.

BRIEF DESCRIPTION OF THE DRAWINGS

FIG. 15 illustrates the modified PSS/SSS transmission timing for several remote radio heads.

FIG. 17 illustrates a neighbor cell list for identifying the PSS/SSS timing transmissions for a plurality of remote radio heads.

FIG. 18 is a look-up table for identifying PSS/SSS timing transmissions as a function of the cell ID.

FIG. 19 illustrates a modulo-four determination of the PSS/SSS timing transmissions as a function of the cell ID.

DETAILED DESCRIPTION

The cellular communication systems disclosed herein enable an advantageous balance between power consumption and mobility performance with regard to discovery of inter-frequency cells in carrier aggregation. For example, the disclosed systems and techniques may be applied to the discovery of small cells corresponding to remote radio heads. Alternatively, the serving base station itself may transmit a secondary component carrier that may be discovered as disclosed herein. Thus the discovery techniques, of the present application apply to both the discovery of new cells as well as discovery of secondary component carriers from a serving base station. As discussed above, the discovery techniques involve the use of a novel beacon signal and/or the use of modified synchronization signals. The beacon signal embodiments will be addressed first Discovery Using a Novel Beacon Signal As the number of inter-frequency carriers or secondary component carriers for which the user equipment needs to make measurements for discovery increases, the trade-off between mobility performance and power consumption becomes ever more important. To achieve an advantageous balance, a new beacon signal is provided for an inter-frequency carrier or secondary component carrier that is time synchronized with a primary or reference carrier. The beacon signal may be a new type of pilot signal or reference signal. The reference carrier may be the primary component carrier in carrier aggregation operations.

Since transmissions of the beacon signals are time synchronized with the reference carrier, the user equipment can omit the conventional cell search. Instead, the user equipment can identify neighbor cells with one attempt or at most a few attempts of receiving the beacon signals. As a result, the power consumption for cell identification can be reduced.

Furthermore, if the user is not traveling at too great a rate, the beacon signal transmission rate can be relatively slow so as to further reduce the power consumption in that the UE will need to make measurements at a correspondingly slower pace. Since the time synchronization with the reference carrier is used for cell identification, no degradation may be observed if the reference carrier mobility performance is maintained.

Moreover, as discussed previously, conventional DRX performance requirements supports the robust mobility performance enabled by the beacon signal discovery techniques disclosed herein. Performance requirements are specified in TS 36.133, V10.3.0, 2011-06 based on assumptions that the user equipment makes measurements once every DRX cycle with the maximum value of the DRX cycle being 2.56 seconds. Thus, a similar periodicity can be used for the beacon signals yet the mobility performance is not degraded for scenarios without excessive speed for the UE user.

Figure 1:
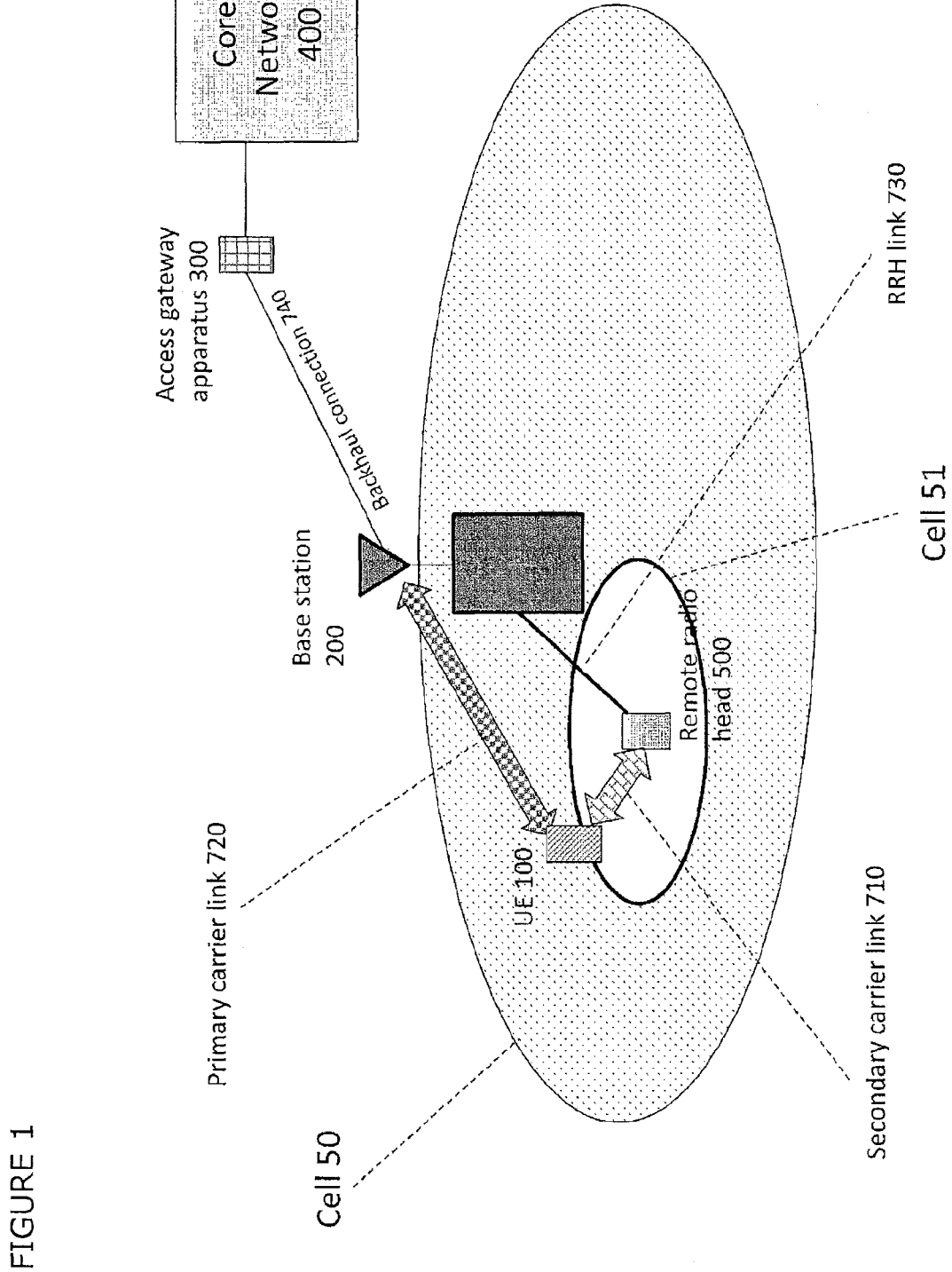
FIG. 1 is an illustration of a cellular communication network including a remote radio head providing a secondary component carrier that is discoverable in either a beacon signal embodiment or in a modified PSS/SSS embodiment.

Turning now to the drawings, a radio communication system that uses an example beacon signal discovery technique will now be discussed in more detail with reference to FIG. 1. The radio communication system (which may also be denoted as a mobile communication system) of FIG. 1 includes a base station 200 and a user equipment (UE) 100. The base station communicates with the user equipment utilizing a primary carrier in a macro cell 50, wherein the base station provide a radio communication service for the user equipment using the primary carrier. The primary carrier may be called a primary component carrier.

The base station has a remote radio head 500, which provides a radio communication service utilizing a secondary carrier for the user equipment at a small cell 51, which is within the macro cell. The small cell may be denoted as a hot spot cell. In the system of FIG. 1, one remote radio head is illustrated, but the base station may have more than one remote radio head within the macro cell. The secondary carrier is conventionally referred to as a secondary component carrier within the field of carrier aggregation.

As used herein, a link between the remote radio head and the user equipment is called a secondary carrier link 710 whereas a link between the base station and the user equipment is called a primary carrier link 720. A link between the base station and the remote radio head is called an RRH link 730.

The base station is connected to a higher layer station, for example, an access gateway apparatus 300 in a backhaul connection 740. In turn, the access gateway apparatus is connected to a core network (CN) 400. The access gateway may be also referred to as MME/SGW (Mobility Management Entity/Serving Gateway).

The base station communicates with the user equipment in the macro cell utilizing Evolve UTRA and UTRAN (alias: Long Term Evolution (LTE)) in the primary carrier link and in the secondary carrier link via the remote radio head. It is noted that other communication system formats may be implemented besides LTE. For example, the radio communication system may be an LTE Advanced system, a WiMAX, a WiFi system, or any other suitable system. The radio resource allocation in the communication links may be Frequency Division Duplex (FDD), Time Division Duplex (TDD), or a combination of these radio resource allocations. In one embodiment, the primary carrier is 2 GHz whereas the secondary carrier is 3.5 GHz. These frequencies are just examples, and other carrier frequencies may be utilized in alternative embodiments.

The base station communicates with the user equipment utilizing carrier aggregation operations, i.e. the base station communicates with the user equipment utilizing both the primary carrier link and the secondary carrier link simultaneously. The base station may communicates with the user equipment utilizing the carrier aggregation operations while the user equipment is located within the small cell 51, whereas the base station may communicates with the user equipment utilizing only the primary carrier link if the user equipment is within the remainder of the macro cell outside of the small cell.

Since the base station is controlling the remote radio head, the secondary carrier is time synchronized with the primary carrier. Thus, signals transmitted in the secondary carrier are time synchronized with those in the primary carrier. This synchronization is exploited as discussed further herein to provide discovery techniques that achieve an advantageous balance between mobility performance and power consumption.

Figure 2:
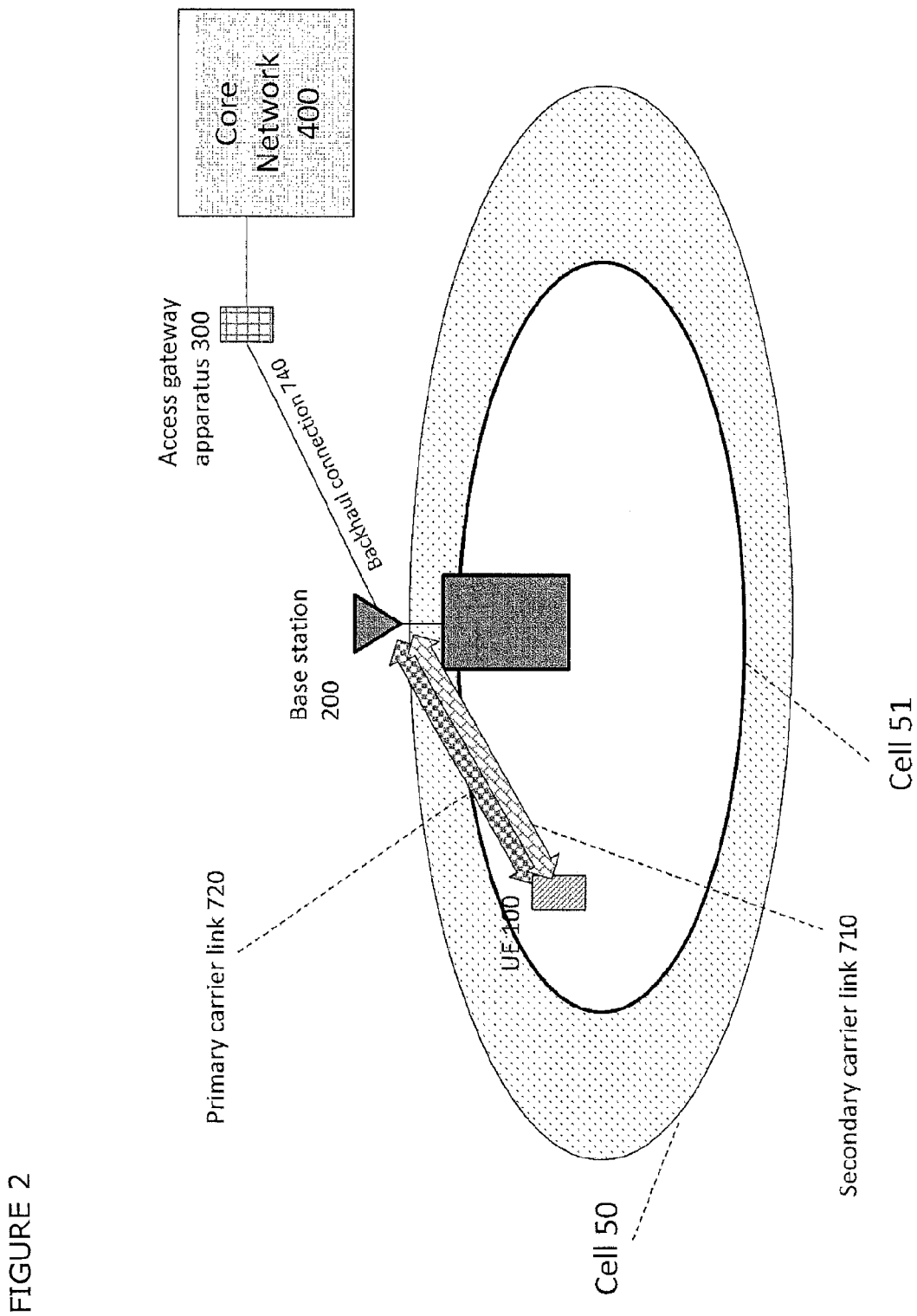
FIG. 2 is as modification of the cellular communication network of FIG. 1 in which the base station uses a common antenna or array of antennas to transmit the primary and secondary carriers.

The discovery techniques disclosed herein are widely applicable to a variety of system architectures. For example, another system architecture is illustrated in FIG. 2. In this figure, the base station does not have a remote radio head 500 but instead transmits signals in the secondary carrier using the same antenna (or another co-located antenna or antenna array) as used to transmit the primary carrier. The small cell may be smaller than the macro cell as illustrated in FIG. 2, or it may be the same size as the macro cell. This embodiment can apply to the carrier aggregation operations addressed in Annex J of TS 36.300, V10.4.0, 2011-06.

In the following examples, the primary carrier is the same as a Release 8 LTE carrier, and the secondary carrier is a new type of carrier that is different from the Release 8 LTE carrier, at least in terms of cell search and measurements. Because the primary carrier is a Release 8 LTE carrier, the primary carrier has common reference signals (CRS) and primary/secondary synchronization signals (PSS/SSS). In contrast, the novel secondary carrier disclosed herein need not include common reference signals nor primary/secondary synchronization signals. Instead, the secondary carrier has beacon signals. Detailed explanation of these novel beacon signals are described herein. It is noted that the primary carrier may be the same as a Release 9 or a Release 10 LTE carrier, instead of a Release 8 LTE carrier.

Alternatively, the secondary carrier may be a carrier which has not only CRS and PSS/SSS, but also the beacon signals. As a result, the secondary carrier may be backward compatible for user equipment that does not support receiving the beacon signals but will still enable the disclosed novel user equipment that support receiving the beacon signals so as to reduce the power consumption for the cell search and measurements in these modified UEs.

Figure 2A:
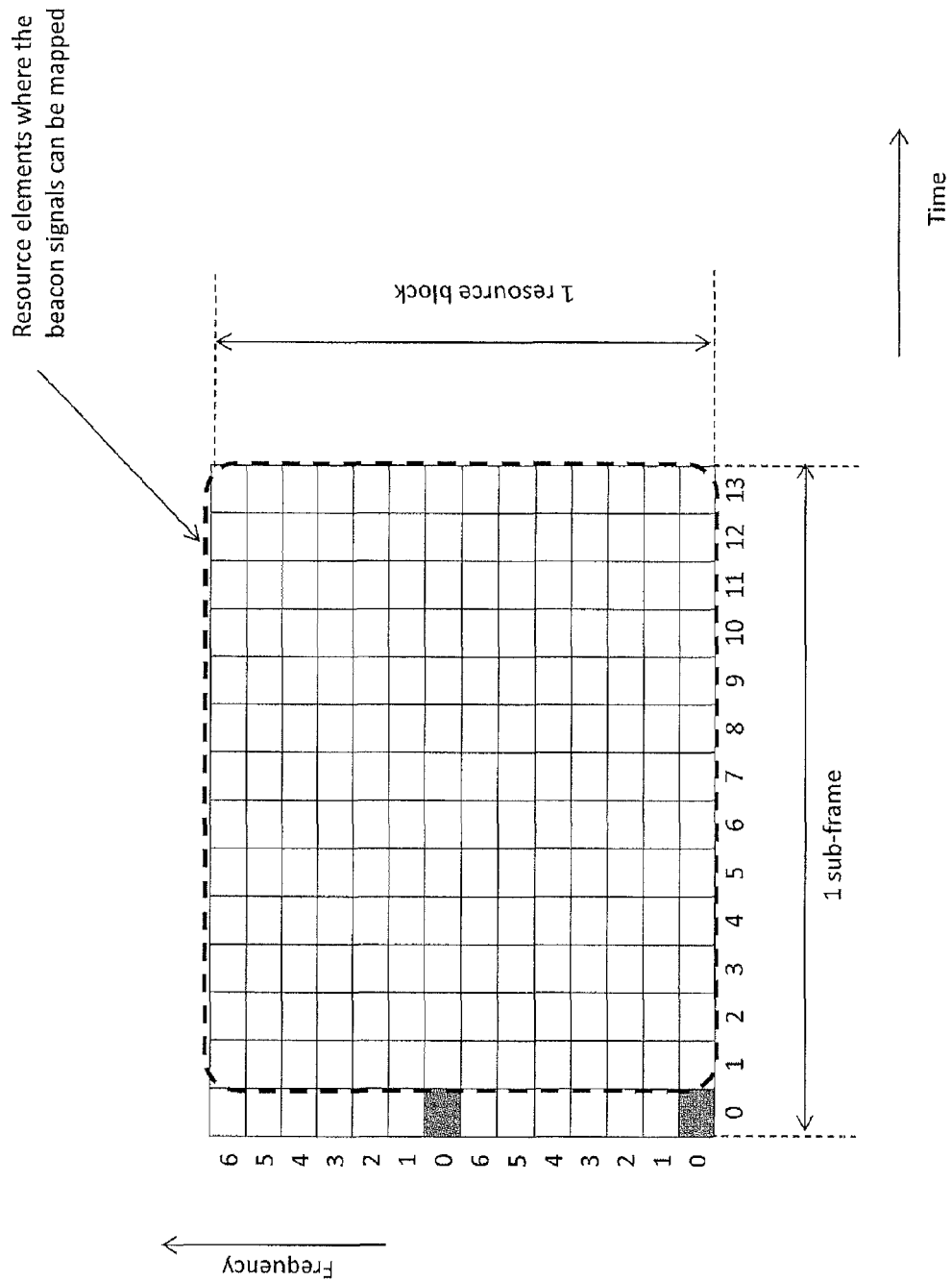
FIG. 2A shows a plurality of resource elements suitable for beacon signal transmission.
Figure 2B:
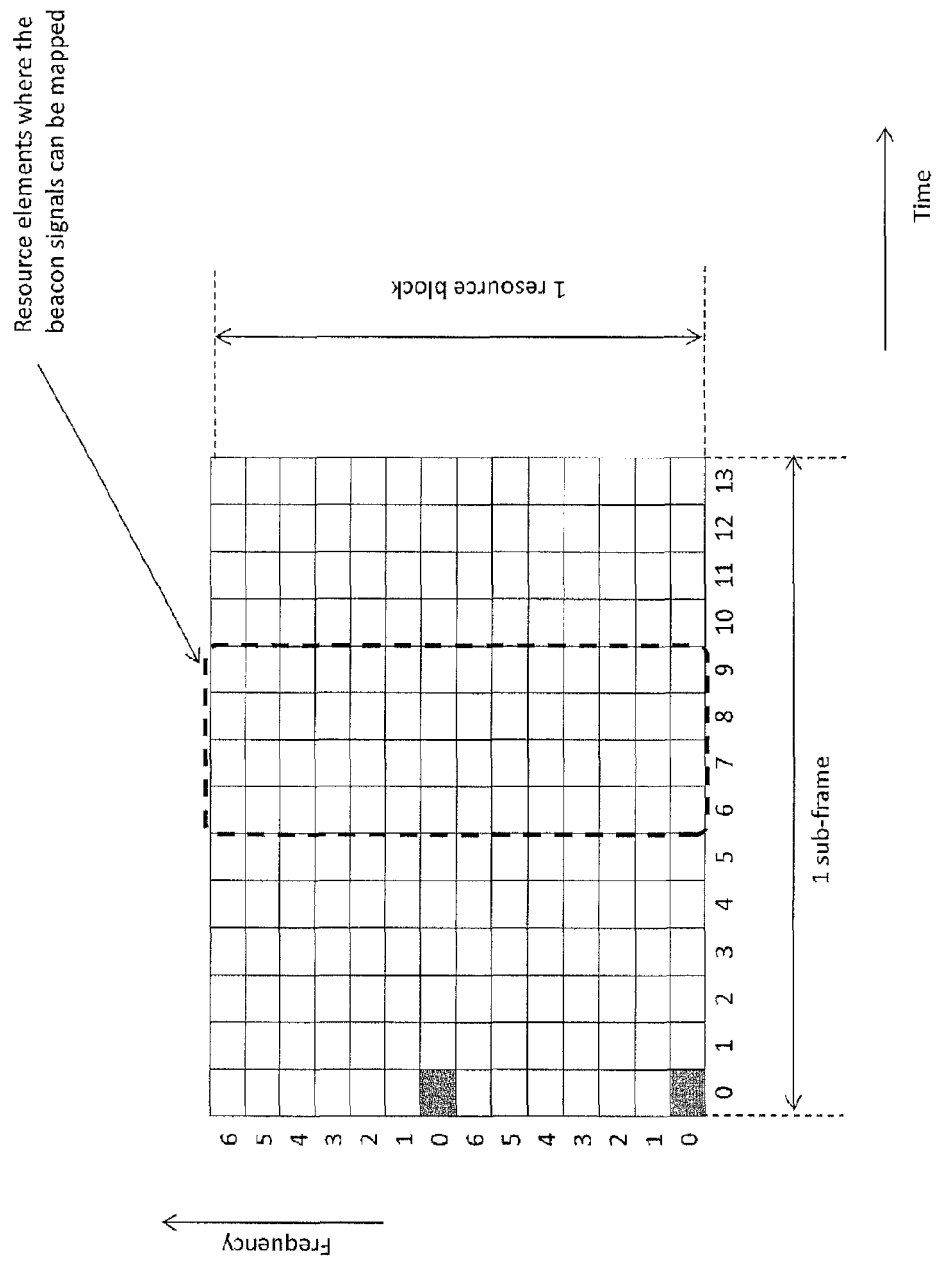
FIG. 2B shows a plurality of resource elements suitable for beacon signal transmission that is just a subset of the suitable resource element of FIG. 2A.

As just discussed, the beacon signals can be transmitted in a Release 8 LTE carrier, in a Release 9 LIE carrier, or in a Release 10 LTE carrier. In this case, the beacon signals may be transmitted in Multi-Broadcast Single Frequency Network (MBSFN) sub-frames, where CRS is transmitted only in the first OFDM symbol, i.e. no CRS is transmitted in OFDM symbols other than the first OFDM symbol. More specifically, the beacon signals may be transmitted in the OFDM symbols other than the first OFDM symbol, as illustrated in FIG. 2A, in which a physical signal frame format for one sub-frame and one resource block in LTE is shown. As seen in FIG. 2A, the first OFDM symbol is reserved for the CRS signal. Alternatively, the beacon signals may be transmitted using resource elements that do not constitute an entire resource block as illustrated in FIG. 2B (with the first OFDM symbol again being reserved for the CRS transmission). In this case, the retention of the CRS signal enables backward compatibility with conventional Release 8 UEs.

For the primary carrier, the user equipment makes cell search and measurements in a conventional fashion. As a result, the same mobility performance as realized in Release 8 LTE can be achieved for the primary carrier. But the search and measurement for the secondary carrier using the beacon signals will be discussed further below.

Figure 3:
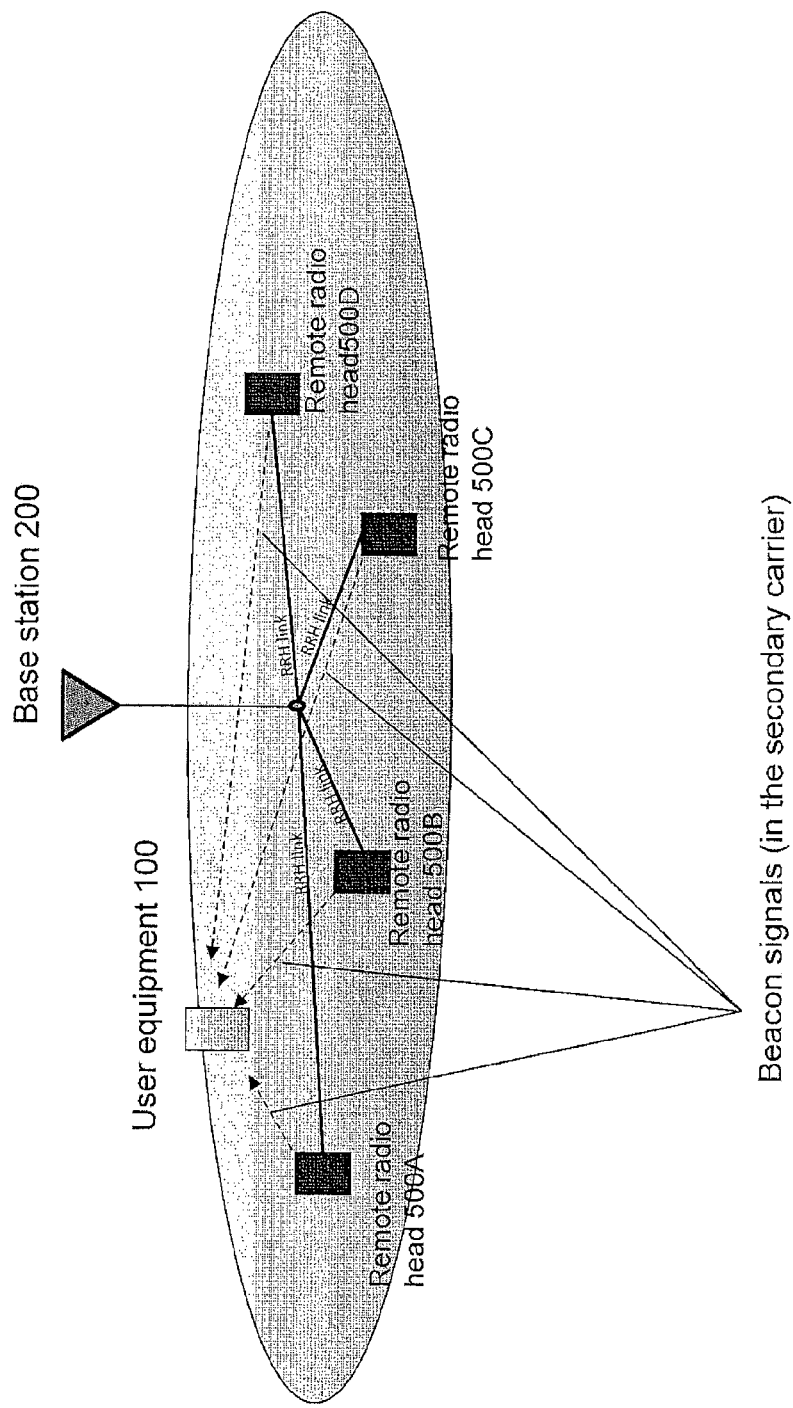
FIG. 3 illustrates a cellular communication network including a plurality of beacon-signal-transmitting remote radio heads.

FIG. 3 illustrates another example radio communication system, in which a base station 200 has four remote radio heads, such as a remote radio head 500A, a remote radio head 500B, a remote radio head 500C, and a remote radio head 500D. Each remote radio head transmits its own beacon signals in downlink in the secondary carrier, and a user equipment 100 monitors the beacon signals for cell search and measurements in the secondary carrier.

Figure 4:
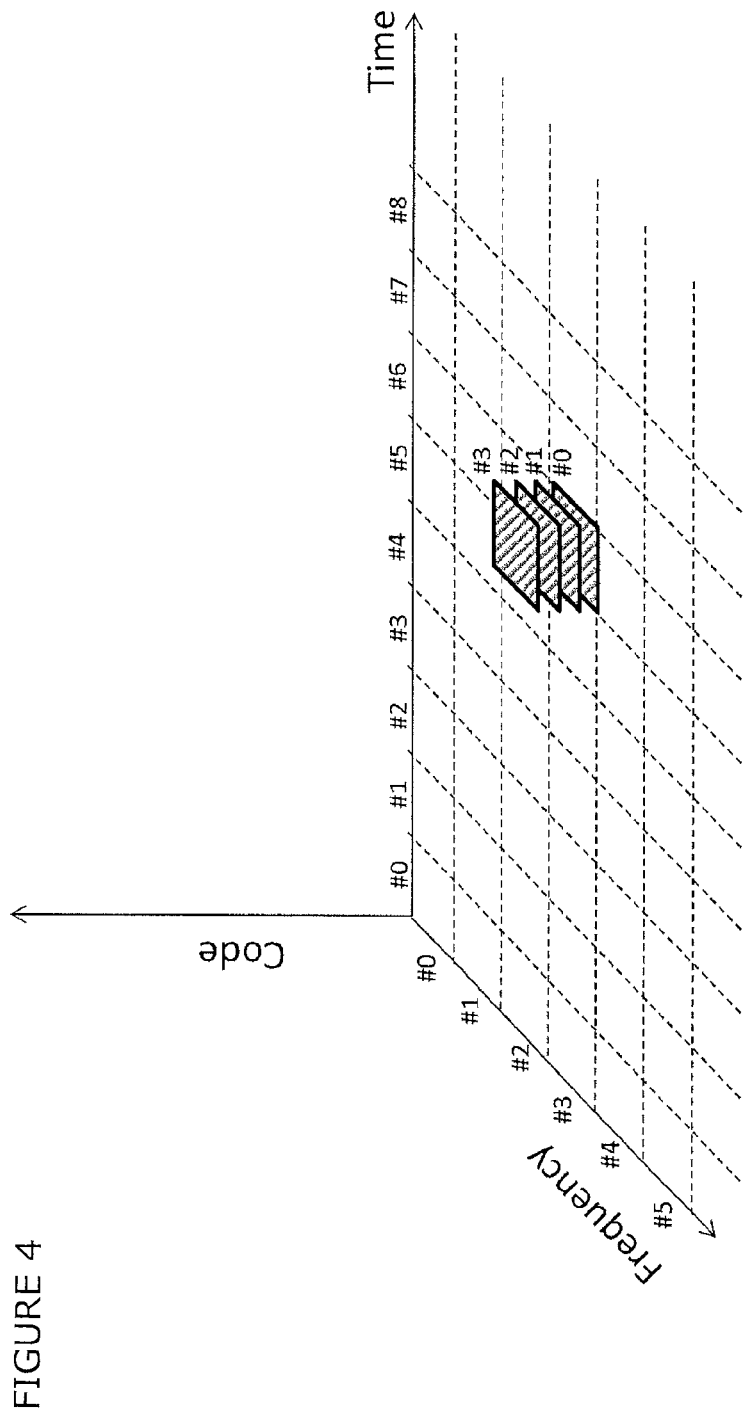
FIG. 4 illustrates the radio resource allocations for a plurality of beacon signals.

FIG. 4 illustrates an example of the radio resources for the beacon signals. In FIG. 4, a frequency resource #3 is assigned as the frequency radio resource for the beacon signals whereas a time resource #6 is assigned as time radio resource. Furthermore, each remote radio head has its own code resource. For example, the code resource #0, #1, #2, and #3 may be assigned to remote radio heads 500A, 500B, 500C, and 500D, respectively. The code resource may be a combination of a Constant Amplitude Zero Autocorrelation (CAZAC) sequence (or Zadoff-Chu sequence) and cyclic shift as discussed below. In other embodiments, each remote radio head has its own frequency resource as opposed to assigning a unique code resource. In other words, the beacon signals for the remote radio heads may be multiplexed in the frequency domain instead of the code domain.

Figure 5:
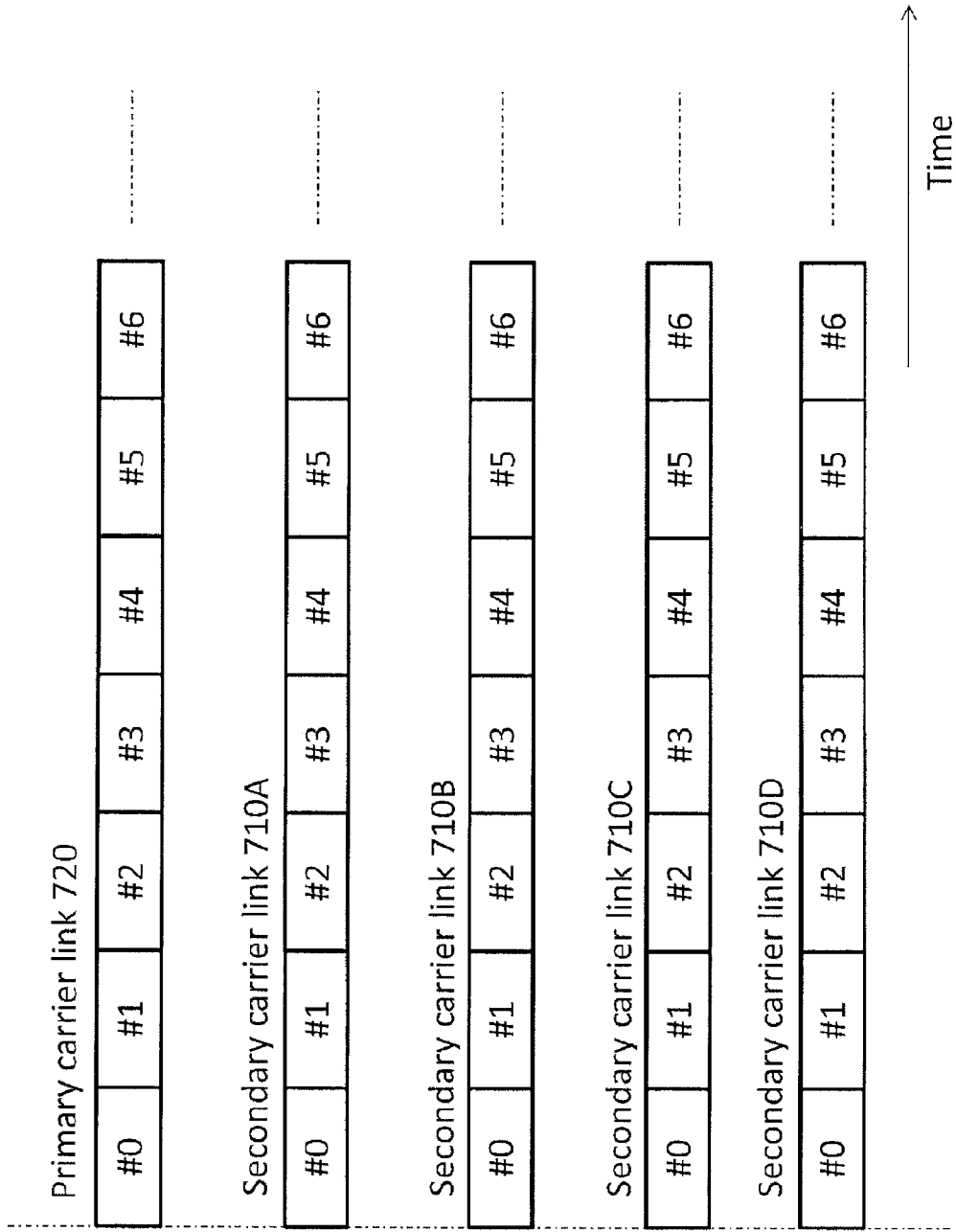
FIG. 5 illustrates the synchronization of the primary carrier link with the secondary carrier links.
Figure 6:
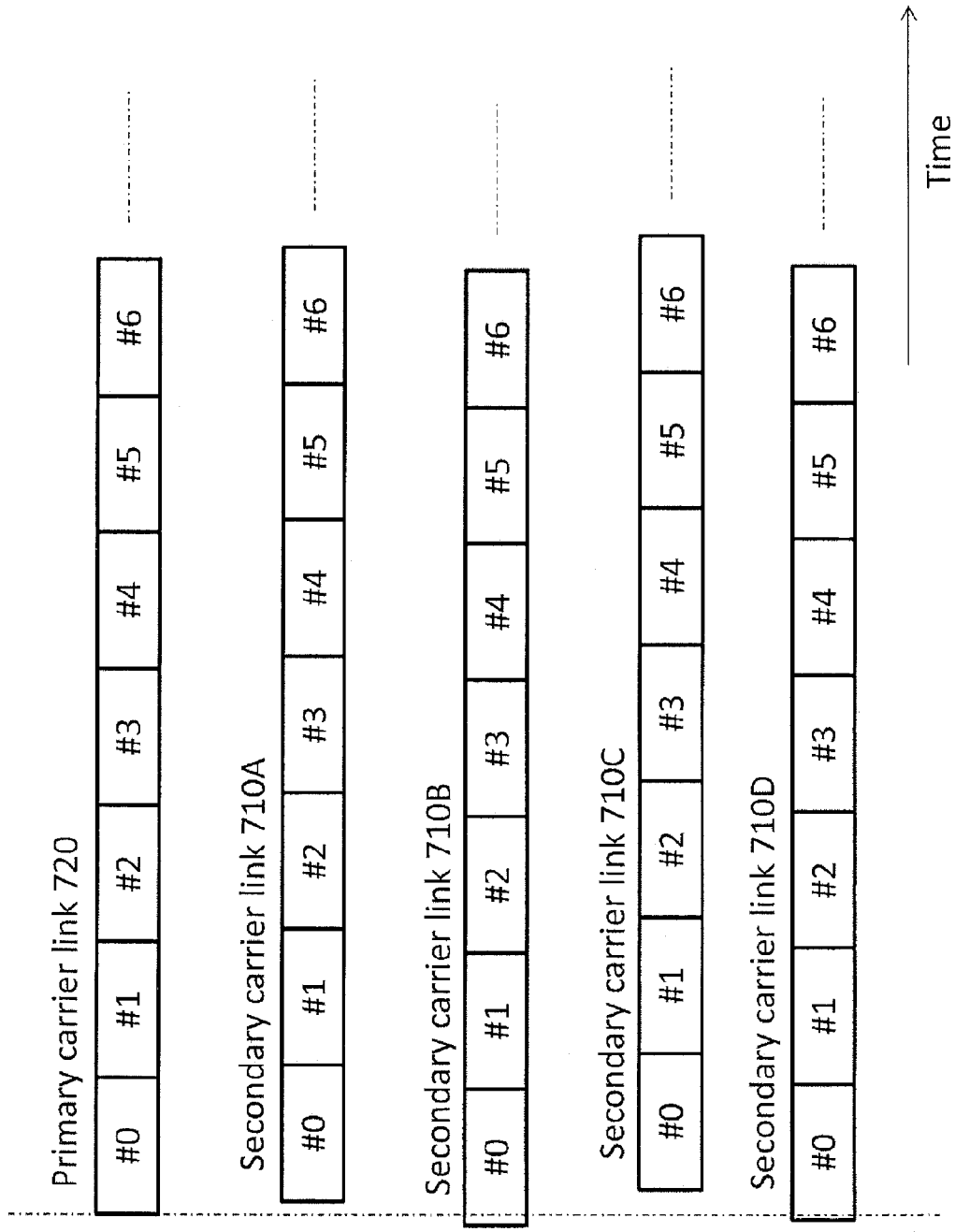
FIG. 6 illustrates the secondary carrier links having various propagation delay offsets with regard to a synchronization with the primary carrier link.

It is assumed that time synchronization is achieved for all the secondary carrier links, i.e. the transmission timing of the time slots for all the secondary links are aligned with each other, as illustrated in FIG. 5. Each time slot may correspond to a sub-frame or a radio frame. Because the remote radio heads will typically each have a different range to the UE as compared to the other remote radio heads, their beacon signals will arrive with correspondingly different propagation delays at the UE. Thus, even if all the remote radio heads are perfectly synchronized, the reception timing of the secondary carrier links at the UE will be asynchronous as shown in FIG. 6. FIG. 6 shows the primary carrier link timing as received at the UE as well as the as-received-at-the-UE timing for a secondary carrier link 710A, a secondary carrier link 710B, a secondary carrier link 710C, and a secondary carrier link 710D. These secondary carrier links correspond, respectively, to remote radio heads 500A, 500B, 500C, and 500D of FIG. 3. Although the secondary carriers were all time synchronized with the primary carrier at the remote radio heads, the different propagation delays causes corresponding timing offsets for the received secondary carriers as shown in FIG. 6. The asynchronous reception resulting from these different propagation delays may be addressed in several fashions. For example, accommodation of these delays may be achieved through an appropriate cyclic prefix length as discussed further below with regard to FIG. 7.

The different propagation delays between the base station and the remote radio heads also causes offsets in secondary timing with regard to the primary carrier. These different propagation delays may be accommodated by utilizing RRH link 730 (FIG. 1). For example, the base station can measure the transfer delay for each RRH link and adjust the transmission timings for the corresponding remote radio heads so that the transmission timings are aligned with each other. More specifically, the base station may adjust the transmission timings for the secondary carriers so that the transmission timings are aligned with a transmission timing of the primary carrier. The transfer delay in the RRH link may depend on cable length in the RRH link and a processing delay in the remote radio head or in the base station.

In particular, the transmission timings in the secondary carrier may be aligned with the downlink frame timing in the primary carrier. More specifically, the transmission timings in the secondary carrier may be aligned with the start of the downlink frame timing in the primary carrier. The downlink frame timing may be specified by the start of the downlink radio frame timing and its downlink radio frame number or its downlink sub-frame number. The radio base station may identify the downlink radio frame number or sub-frame number through control signaling to the UE such as through the use of broadcast channels, dedicated control signaling and other suitable control signals. Alternatively, uplink frame timing may be utilized for the time synchronization.

Other time synchronization techniques may be utilized to achieve the time synchronization for the secondary carrier links. For example, GPS may be used for the time synchronization. Regardless of the specific synchronization technique, the frame timing of the secondary carrier links is specified so that the frame timings of the secondary carrier links are all time synchronized with each other.

For the user equipment, the time synchronization is achieved with reference to the primary carrier. Thus, the reception timing of the secondary carrier links at the UE is based on the primary carrier timing. In this fashion, the user equipment assumes that the frame timing for the secondary links are aligned with a corresponding frame timing in the primary carrier so that the UE receives the beacon signals according to this assumed timing.

With regard to cell identification and link quality measurement using the received beacon signal at the user equipment, the user equipment has only to decode/demodulate the beacon signals transmitted by multiple remote radio heads in the predetermined radio resources as discussed with regard to FIG. 4, and therefore power consumption for the cell discovery utilizing the beacon signals can be minimized. More detailed examples are shown below. Advantageously, the user equipment does not have to achieve time synchronization with multiple remote radio heads using conventional CRS and PSS/SSS signals because it can achieve the time synchronization by decoding the beacon signals, which are time-synchronized with the signals in the primary carrier link. Thus the complexity for cell identification and measurements and associated power consumption are both reduced as compared to the use of conventional PSS/SSS techniques.

Referring again to FIG. 3, the remote radio heads are shown transmitting their beacon signals to the user equipment. As mentioned above, a common time and frequency domain resource may be used for all the beacon signals such that the beacon signals are differentiated through the use of different code resources. In other words, a different code may be assigned to each beacon signal. For example, the code resource #0, #1, #2, and #3 of FIG. 4 may be assigned to remote radio heads 500A, 500B, 500C and 500D, respectively. In one embodiment, a CAZAC (Constant Amplitude Zero AutoCorrelation) sequence may be used for each code. More specifically, Zadoff-Chu sequences may be used for the codes. Alternatively, Walsh sequences may be used for the codes. Alternatively, other orthogonal sequences may be used for the codes. In yet another alternative embodiment, the code sequences for the various cells may each be partially orthogonal the other code sequences. In a partial orthogonal embodiment, some code sequence pairs may be orthogonal with each other, but others may not be orthogonal with each other.

In a fully orthogonal embodiment, the code sequences do not interfere with each other. As a result, so-called pilot pollution problems can be avoided, even when the beacon signals transmitted by a plurality of remote radio heads collide with each other upon reception at the UE. Thus, the power consumption for cell search and measurements can be reduced because the SIR for the beacon signals can be improved by avoiding pilot pollution problems.

Figure 7:
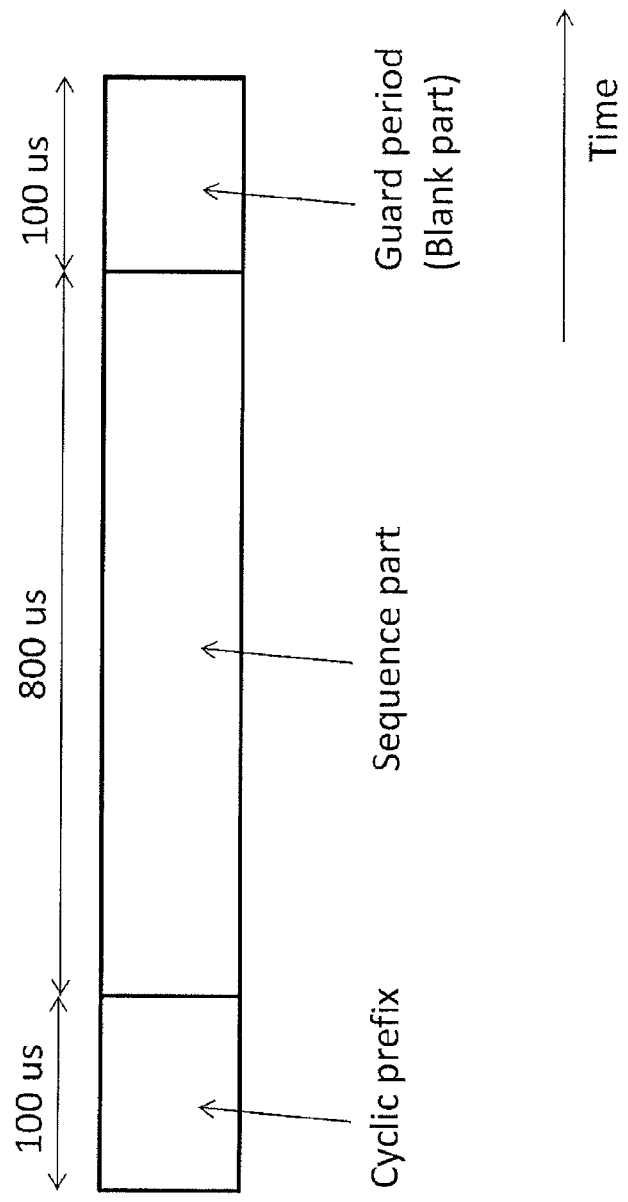
FIG. 7 illustrates the parts of a beacon signal OFDM symbol.
Figure 8:
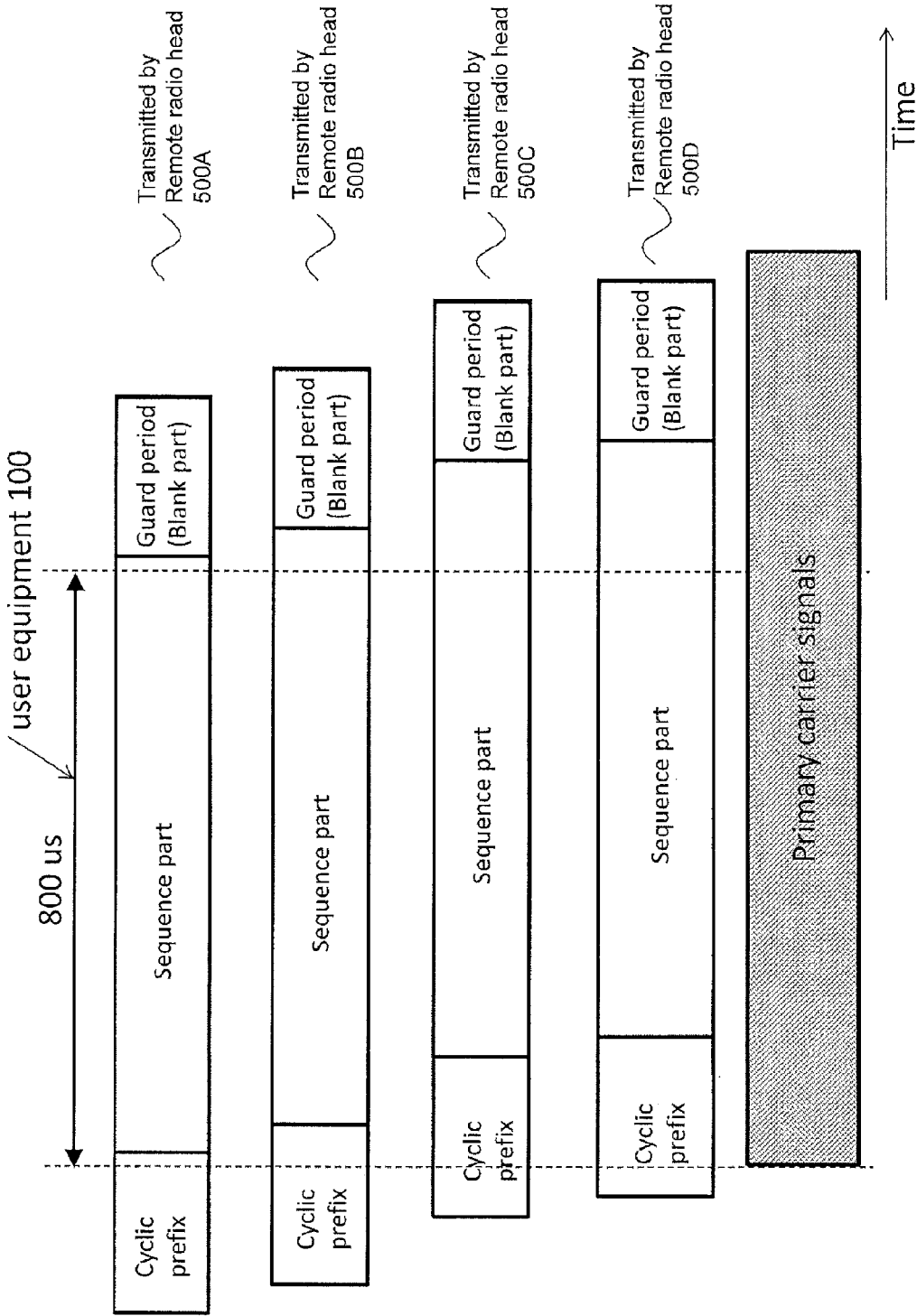
FIG. 8 illustrates how the cyclic prefix enables the elimination of inter-symbol interference in the reception of various beacon signal symbols despite the presence of various propagation delay offsets, wherein the receiving window is synchronized with the primary carrier link.

In one embodiment, the beacon signal may have a physical layer format as illustrated in FIG. 7. Analogous to a conventional LTE symbol, the beacon signal includes a cyclic prefix, a sequence part, and a guard period. The guard period may also be denoted as a blank part. The sequence part may comprise a CAZAC code. In a cyclic-prefix embodiment, the user equipment may have a receiving window as illustrated in FIG. 8. In this figure, the received beacon signals from different remote radio heads are not time aligned with each other upon reception at UE 100 due to their different propagation delays. So long as these propagation delays are smaller than the cyclic prefix length, the user equipment can accurately demodulate and decode all the beacon signals.

Figure 8A:
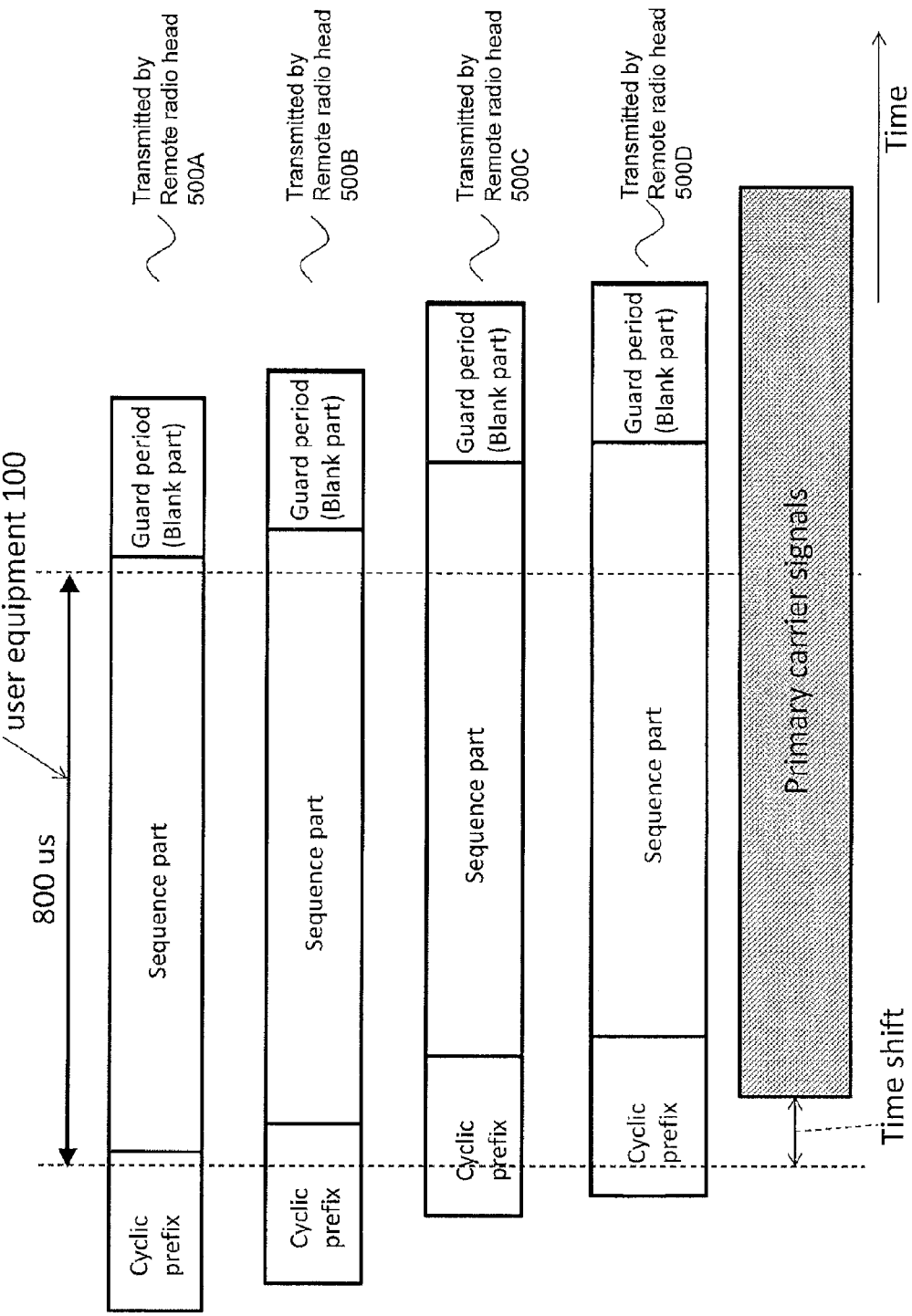
FIG. 8A illustrates a modification of the timing of FIG. 8 in which the receiving window is offset with regard to the primary carrier link.

The user equipment may align the receiving window based on a timing of received signals in the primary carrier as shown in FIG. 8. The received signals may be at least one of common reference signals, PSS/SSS, and other suitable signals. Alternatively, the user equipment may decide the position of the receiving window based on the timing of the received signals in the primary carrier and a time shift as illustrated in FIG. 8A. The base station may communicate the appropriate time shift amount to the UE using control signaling.

Figure 9:
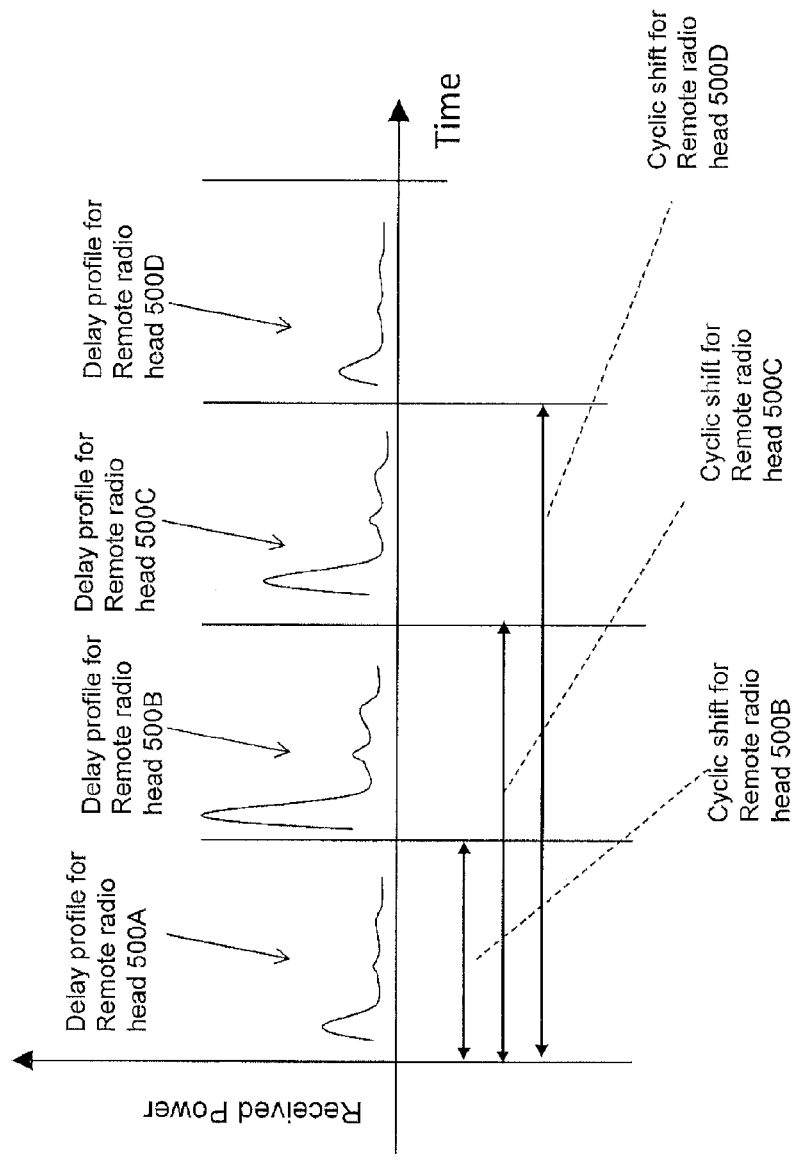
FIG. 9 illustrate the delay profile for the beacon signals from various remote radio heads as controlled through cyclic shifts.

The user equipment may obtain delay profiles for the beacon signals transmitted by each remote radio head as illustrated in FIG. 9. The delay profiles for the beacon signals transmitted from each remote radio head may be shifted due to a cyclic shift of the Zadoff-Chu sequence, as illustrated in FIG. 9. In this embodiment, the cyclic shift for remote radio head 500A is assumed to zero. As a result, the user equipment can easily make cell search and measurements for delay and received power level of the beacon signal for each remote radio head (or equivalently, for each small cell) in the secondary carrier. As a result, UE complexity for cell search and measurements in the second carrier can be reduced.

The cyclic shift may be adjusted based on a range between the remote radio head and the base station (and/or to a size of the corresponding small cell). Alternatively, the cyclic shift may be adjusted based on a cell range to the base station (size of the macro cell). In case that the cell range is large, it can be assumed that the remote radio heads in such a large cell are also similarly widely distributed, which leads to a corresponding large spread of delays for the received secondary carriers at the UE. Thus, the cyclic shift difference may be made relatively large in such a large cell. On the other hand, if the macro cell is relatively small, the propagation delay spread for the beacon signals upon reception at the UE is also relatively small. Thus, if the macro cell is relatively small, the cyclic shift differences between the various beacon signals can also be made relatively small. The base station may notify the user equipment 100 of the cyclic shift for each remote radio head using control signaling. The control signaling may be transmitted in broadcast channels or in RRC signaling in the primary carrier.

The physical random access channel (PRACH) or a physical channel similar to PRACH may be used for the beacon signals. PRACH is defined as a LTE physical channel in TS 36.211, V10.2.0, 2011-06. In such an embodiment, the remote radio head transmits signals similar to a random-access-preamble in the predetermined radio resource. The random access preamble may be assigned uniquely to the remote radio head by the base station. To assist in the decoding of the beacon signal, the base station identifies the random access preambles to the user equipment using appropriate control signaling.

The beacon signals may be transmitted relatively infrequently. For example, the beacon signals may be transmitted once per second. Since time synchronization in the secondary carrier links is achieved by utilizing the primary carrier timing, the beacon signals do not have to be transmitted frequently. As a result, the user equipment has only to decode/demodulate the beacon signals according to the relatively infrequent transmission rate (e.g., once per second). Therefore the power consumption for the cell search and measurements can be minimized. Furthermore, the beacon signals are transmitted much less frequently than the common reference signals (CRS) or the synchronization signals (PSS/SSS) in LTE, and therefore power consumption at the network side (at the remote radio bead 500) can be reduced when no data is transmitted in the secondary carrier.

The beacon signal transmission period (i.e, the interval between consecutive beacon signal transmissions) may be very large, e.g. 1 or 2 seconds, or may be reasonably large, e.g. 100 milliseconds or 200 milliseconds. If the periodicity is very large, the power consumption for measurements and the interference issues can be reduced significantly, but the user equipment may need more time to detect neighbor remote radio heads and make measurements for them because it needs some measurement samples to achieve good accuracy. As a result, latency of mobility procedures may be increased, which adversely affects mobility performance. If the periodicity is reduced, the power consumption for cell search and measurements is increased the latency will be decreased. So, the periodicity of the beacon signals can be optimized based on the above aspects, such as power consumption for cell search measurements, latency of mobility procedures and the like. The periodicity of the beacon signals may be network configurable and the base station may inform the user equipment of the periodicity through control signaling.

In some embodiments, the user equipment does not support data transmissions/receptions simultaneously with decoding/demodulating the beacon signals in the secondary carrier. In this case, the base station may consider this configuration of the user equipment in its scheduling for the secondary carrier link. For example, the base station may avoid assigning radio resource to the user equipment in the secondary carrier during the times when the beacon signals are transmitted.

The beacon signal may be denoted as an "extension carrier reference signal" or as an "extension carrier synchronization signal." The beacon signals may be distributed in the frequency domain so that signal strength fluctuation due to Rayleigh fading may be suppressed and more accurate measurements for the radio link quality may be achieved.

The base station may notify the user equipment of beacon signal information for each remote radio head. The information may be included in the control signaling, which notifies the user equipment of secondary carrier measurement information. Some examples of suitable beacon signal information includes a code domain resource for the beacon signals
   for example, an index of the Zadoff-Chu sequence
a frequency domain resource for the beacon signals
   for example, the carrier frequency of the beacon signals
a time domain resource for the beacon signals
   the periodicity of the beacon signals
   the time frame in which the beacon signals are transmitted such as by specifying the radio frame number or sub-frame number.
a transmission power of the beacon signals
a cyclic shift for each beacon signals
   e.g., the cyclic shift amount
an identifier of the remote radio head The above information is specified for each remote radio head, and therefore may be included in a neighbor cell list for the remote radio head. A remote radio head may correspond to a cell in the secondary carrier. The above beacon signal information may be signaled by broadcast information in the primary carrier link or by dedicated signaling in the primary carrier link.

In the above examples, one time domain resource and frequency domain resource are specified for the beacon signals as illustrated in FIG. 4. But more than one time domain resource or more than one frequency domain resource may be configured for the remote radio heads. For example, if there are many remote radio heads, the number of code-domain resources may not be sufficient and more than one time domain resource or more than frequency domain resource may need to be used.

Figure 9A:
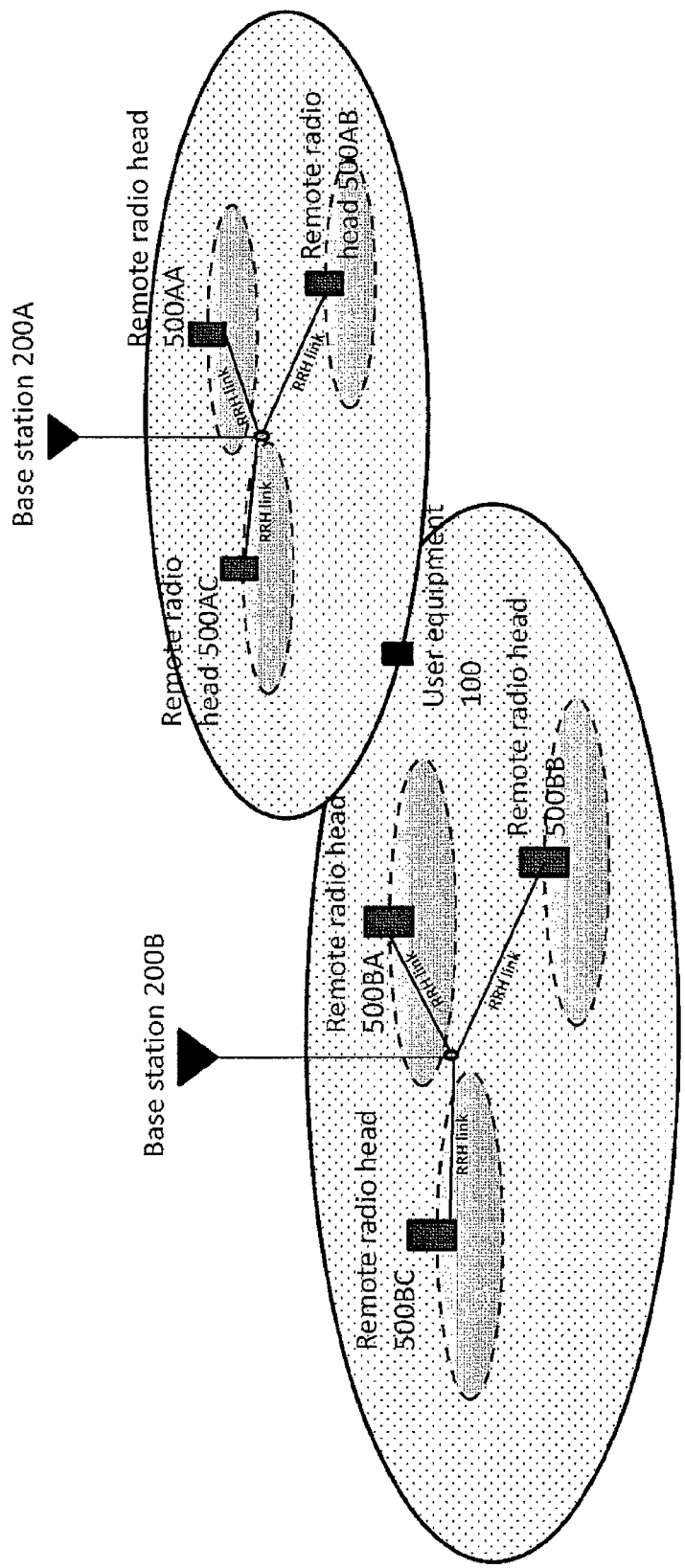
FIG. 9A illustrates a cellular communication network with a serving base station and a neighboring base station, where each of the base stations has its own constellation of remote radio heads.

In the above examples, multiple remote radio heads for one base station have been discussed. However, there are embodiments that include multiple remote radio heads fir more than one base station such as illustrated in FIG. 9A. In this figure, a base station 200A has three remote radio heads 500AA/500AB/500AC, and another base station 200B has three remote radio heads 500BA/500BB/500BC. It is assumed for this embodiment that the primary carrier signals transmitted by the base stations are time synchronized with each other.

In terms of carrier aggregation operations, if the user equipment communicates with the base station 200A in the primary carrier, then that user equipment does not communicate with remote radio heads in the neighboring cells (e.g, remote radio heads 500BA/500BB/500BC). The reason for this is that multiple cells in the carrier aggregation operations should belong to one base station. In this sense, the user equipment 100 does not have to make cell search/measurements for remote radio heads corresponding to other macro cells. A serving base station corresponds to a base station which currently communicates with the user equipment 100. Thus, carrier aggregation is only performed with the secondary component carriers corresponding to small cells (and their remote radio heads) within the serving base station's macro cell.

With regard to interference, however, the user equipment should communicate with a remote radio head which has the best radio link quality in the secondary carrier. Otherwise, the secondary carrier having the better radio link quality may interfere with a lower quality secondary carrier that is being currently used for carrier aggregation. In this sense, the user equipment may make cell search and measurements for remote radio heads that belong to neighbor base stations/macro cells. Based upon these measurements, the user equipment or the base station may release the secondary carrier link with the serving remote radio head so that it does not interfere with a remote radio head having a secondary carrier with better radio link quality as compared to the serving remote radio head.

If the user equipment makes measurements for remote radio heads which belongs to the serving base station and also for remote radio heads belonging to neighbor base stations, the base station notifies the user equipment of beacon signal information for the remote radio heads in the neighboring cells analogously as described above. The information may be included in a neighbor cell list for the secondary carrier.

Figure 10:
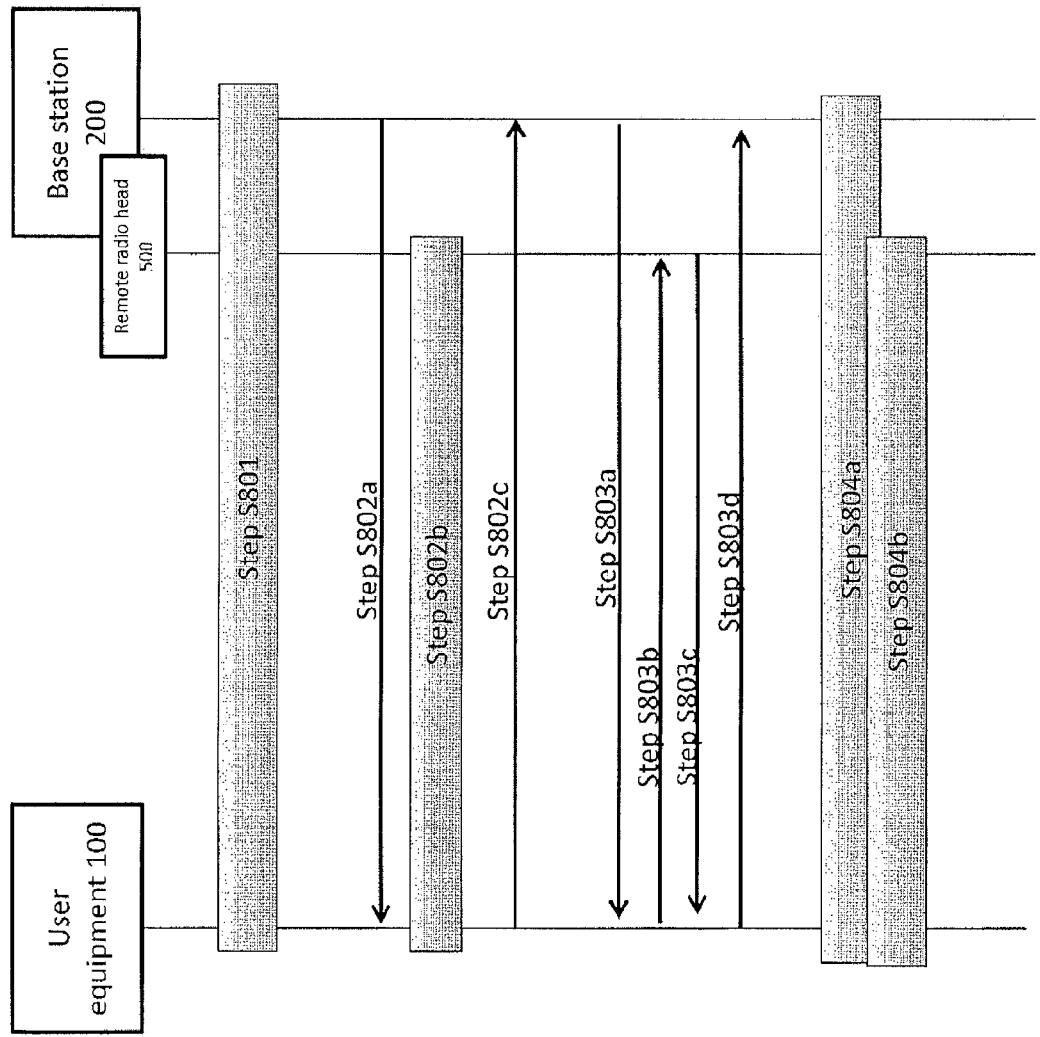
FIG. 10 illustrates the call flow for the establishment of a secondary carrier link for both the beacon signal embodiments and the modified PSS/SSS embodiments.

Referring to FIG. 10, an operation of the mobile communication system according to the embodiment of the present invention is described. As illustrated in FIG. 10, remote radio head 500 belongs to base station 200 such that the remote radio head and the base station may be considered to comprise a single apparatus. Therefore, communications between the base station and the remote radio head are omitted in FIG. 10.

In the following steps, the base station communicates with the user equipment utilizing only the primary carrier initially such that the secondary carrier link is established subsequent to the primary carrier communication. Thus, in an initial step S801, the base station communicates with the user equipment in the primary carrier link. In step S801, the base station transmits downlink data to the user equipment and receives uplink data from the user equipment over the primary carrier link. The downlink and uplink data may correspond to sending/receiving e-mails, browsing web sites, downloading files, uploading files and the like. This data flow may be referred to as "traffic data."

In a step S802a, the base station transmits control signaling to the user equipment over the primary carrier link to command the user equipment 100 to make measurements for the secondary carriers. Pursuant to this command, the user equipment makes the measurements in a step 802b. In a step 802c, the user equipment transmits a measurement report to the base station 200 in the primary carrier link 720. The measurement report identifies the remote radio head having the best downlink (DL) radio link quality.

The control signaling in step S801 may include information for the measurements. For example, the control signaling may include at least one of carrier frequency for the secondary carriers, bandwidth of the secondary carrier links, identification numbers for the remote radio heads, measurement quantity, beacon signal information, and so on. The measurement quantity information may include an indicator of received power for the beacon signals or received quality of the beacon signals.

The beacon signal information may identify the radio resource allocation for the beacon signals. More specifically, the information may include beacon signal periodicity, the frequency-domain resource allocation, the time-domain resource allocation, the code-resource allocation, and so on. The transmission power for the beacon signals may be included as well. Furthermore, rules for sending measurement reports to the base station 200 may also be included in the control signaling transmitted in step S802*a*. The rules may be criteria that are specified for Release 8 or Release 9 or Release 10 LTE, such as Event A1, A2, A3, A4, A5, A6 and the like. These rules are specified in TS 36.331, V10.2.0, 2011-06. Threshold value or Layer-3 filtering coefficient as well as time-to-trigger may also be identified through the control signaling. In addition, cell selection/reselection information may also be communicated through the control signaling. For example, idle-mode measurement information may also be included in the control signaling. The control signaling may be transmitted in the dedicated control signaling or in the broadcast information.

The control signaling in step S802*a* may include an indicator whether or not a secondary carrier for the beacon signals is available in the serving base station's macro cell. The control signaling may be transmitted in step S801 instead of step S802*a*.

In step S802*b*, the user equipment measures the DL radio link quality in the secondary carrier by utilizing the secondary carrier's beacon signals. The DL radio link quality may be the received beacon signal power. Alternatively, the DL radio link quality may be the received beacon signal quality. In yet another alternative embodiment, the DL radio link quality may be based on the signal-to-interference ratio of the received beacon signal. The beacon signals format and measurements may be the same as described above.

In a step S803*a*, the base station transmits control signaling to the user equipment over the primary carrier link to command the user equipment to establish the secondary carrier link with a particular remote radio head. In general, this remote radio head is the one which has the best DL radio link quality identified in the measurement report of step 802*c*. For example, the control signaling of step S803*a* may include at least one of the following parameters:

a carrier frequency for the secondary carrier link
a frequency band indicator for the secondary carrier link
a system bandwidth (Channel bandwidth) of the secondary carrier link
an identification number of the remote radio head 5 (or its corresponding small cell)
an UL maximum transmission power in the secondary carrier link
the DL and UL time slots in the secondary carrier link (in a TDD embodiment)
the random access channel for the secondary carrier link 710
an identification for uplink physical control channels such as PUCCH for the secondary carrier link
an identification for downlink physical control channels such as PDCCH and PHICH for the secondary carrier link
the uplink physical shared channel for the secondary carrier link
the downlink physical shared channel for the secondary carrier link
the uplink sounding reference signal for the secondary carrier link
the uplink power control information for the secondary carrier link
the downlink or uplink cyclic prefix for the secondary carrier link
time alignment control in the uplink for the secondary carrier link
the MAC configuration for the secondary carrier link
security parameters for the secondary carrier link In a step S803*b*, the user equipment transmits a preamble to the remote radio head in the secondary carrier to establish the secondary carrier link between the user equipment and the remote radio head. The preamble may be a random access preamble. Alternatively, the preamble may be a pre-assigned dedicated preamble. The pre-assigned access signaling may be transmitted to the user equipment by the base station 200 in step S803*a*. In a step S803*c*, the remote radio head transmits response signals to the preamble transmitted in step S803*b*. As a result, the secondary carrier link is established.

In a step S803*d*, the user equipment transmits control signaling to the base station over the primary carrier link and notifies the base station that the secondary carrier link has been successfully established. In some embodiments, step S803*d* can be omitted. Alternatively, this control signaling may be transmitted to the base station via the remote radio head in the secondary carrier.

In a step S804*a*, the base station communicates with the user equipment over the primary carrier link. Step S804*a* is thus the same as step S801. In that regard, this communication with the base station may be conducted continuously during the steps shown in FIG. 10. In a step S804*b*, the remote radio head 500 communicates with the user equipment over the secondary carrier link. In this fashion, the user equipment communicates with the base station using carrier aggregation.

The steps shown in FIG. 10 may be described in terms of the remote radio head acts as follows. The remote radio head operation comprises transmitting beacon signals in the secondary carrier (step S802*b*).

Similarly, the steps shown in FIG. 10 may be described with regard to user equipment acts as follows. The user equipment operation includes making cell search and measurements using beacon signals transmitted by the remote radio head (steps S802*a*/802*b*/802*c*), establishing the secondary carrier link with the remote radio heads 500 (steps S803*a*/803*b*/803*c*/803*d*), and communicating with the base station using carrier aggregation (step S804*a*/804*b*).

In alternative embodiments, the remote radio head may omit the beacon signal transmissions if no secondary carrier links exist, i.e. when there is no data to be transmitted in the secondary carrier. In such an embodiment, the remote radio head may start transmitting the beacon signals in the secondary carrier at the beginning of step S802*b*. As a result, the remote radio head can reduce power consumption when here is no data to be transmitted in the secondary carrier.

Figure 11:
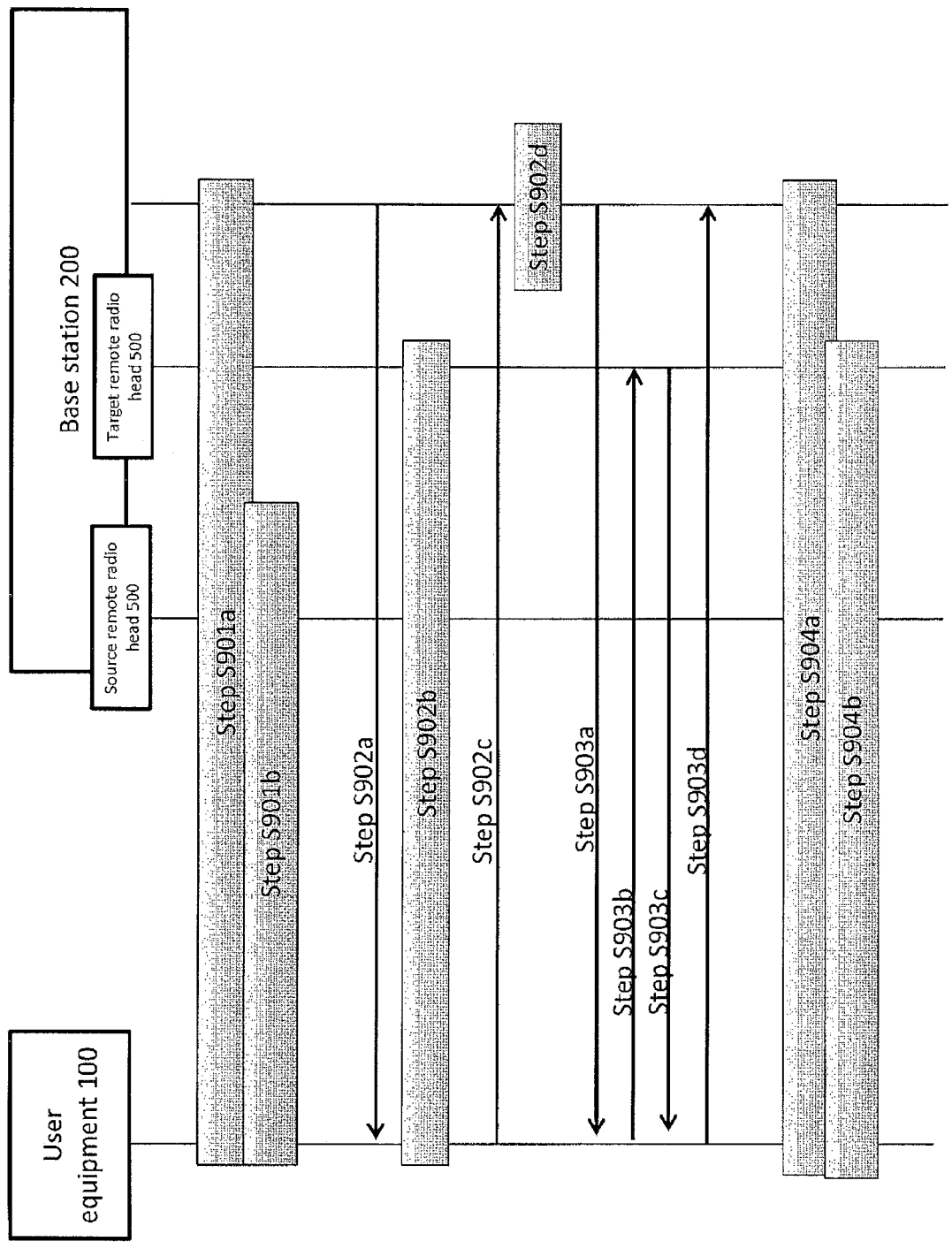
FIG. 11 illustrates the call flow for the handoff of the secondary carrier link from a serving remote radio head to a target remote radio head for both the beacon signal embodiments and the modified PSS/SSS embodiments.

As a mobile user's UE leaves the coverage of an initial small cell and moves into the coverage of a neighboring small cell, the UE should release the secondary carrier link it has with the initial small cell and establish a secondary carrier link with the neighbor small cell. An example call flow for such a handoff is shown in FIG. 11. In this figure, the source/target remote radio heads 500 belong to the base station 200. Thus these radio heads constructively form a single apparatus with the base such that communications between the base station and the remote radio heads are omitted in FIG. 11.

In this call flow, the base station initially communicates with the user equipment utilizing the primary carrier in a step S901a and also by using the secondary carrier via the source remote radio head in a step S901b. Thus, the base station communicates with the user equipment using carrier aggregation operations in steps S901a and S901b. Steps S901a and S90b may be the same as steps 804a and S804b, respectively, as discussed with regard to FIG. 10.

In a step S902a, the base station transmits control signaling to the user equipment over the primary carrier link to command the user equipment 100 to make measurements of the secondary carrier. Step S902a thus corresponds to step S802a of FIG. 10. If the control signaling in step S902a has already been transmitted to the user equipment such as in step S901a, this step may be omitted.

In a step S902b, the user equipment conducts the measurements for the secondary carrier. In one embodiment, the user equipment conducts such measurements by determining the DL radio link quality for the serving remote radio head as well as for the target remote radio head(s). The DL radio link quality may be determined from the received beacon signals. The DL radio link quality may be at least one of received power of the beacon signals, received quality of the beacon signals, path loss, signal-to-interference ratio (SIR) of the beacon signals, channel state information, channel quality indicator, received signal strength indicator of the beacon signals, and other suitable parameters determined from the secondary carrier. Through these measurements, the user equipment determines whether or not a target remote radio head has a better DL radio link quality than the serving remote radio head. For example, the user equipment may be closer to the target remote radio head and further away from the serving radio head.

Figure 12:
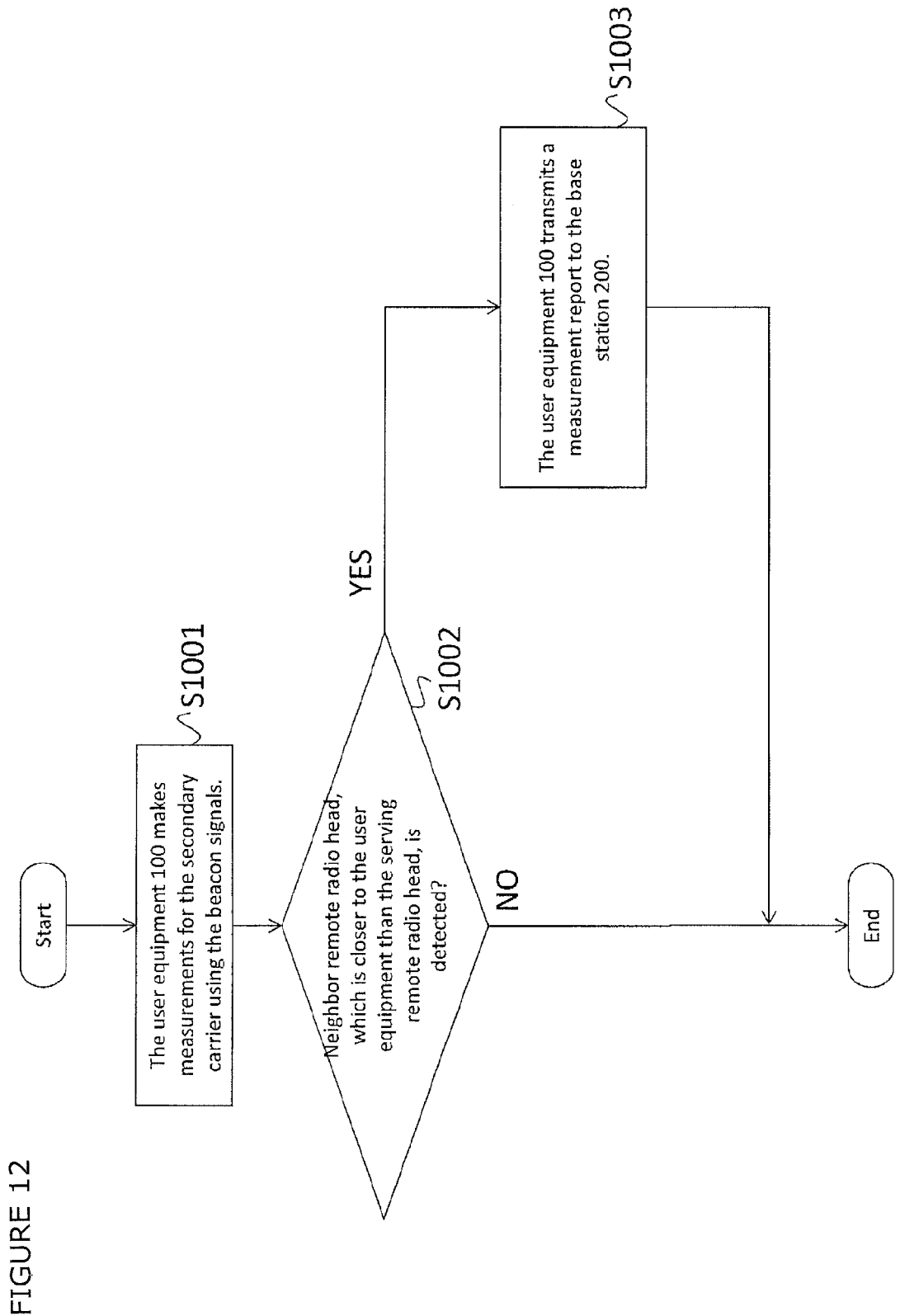
FIG. 12 is a flowchart for the handoff method of FIG. 11.

FIG. 12 is a flow chart for the handoff process call flow shown in FIG. 11. In a step S1001, the user equipment measures the DL radio link, quality as discussed with regard to step 902b. In a step S1002, the user equipment determines whether a target remote radio head is closer than the serving remote radio head. For example, if the radio link quality of the neighbor (or target) remote radio head is higher than that of the serving remote radio head, it may be assumed that the neighbor remote radio head is closer to the user equipment than the serving remote radio head.

More specifically, if the following equation is true, it may be assumed that the neighbor remote radio head is closer to the user equipment than the serving remote radio head:

$$RLQ_{Neighbor} - Hysteresis > RLQ_{Serving}$$

where $RLQ_{Neighbor}$ is the radio link quality of the neighbor remote radio head and $RLQS_{erving}$ is the radio link quality of the serving remote radio head. This equation is analogous to Event A3 or A6, which is specified in TS 36.331, V10.2.0, 2011-06. Other events such as Events A1, A2, A4, or A5 may be utilized in alternative embodiments.

If the neighbor remote radio head is determined to be closer than the serving remote radio head (a YES result for a step S1002), the user equipment transmits a measurement report to the base station in a step S1003 so as to notify the base station of this determination. Conversely, if the result of step S1002 is a NO (where the neighbor remote radio head is not closer), the user equipment does not transmit the measurement report to the base station. Steps S1001 and S1002 of FIG. 12 thus correspond to step S902b in FIG. 11.

In a step S902c, the user equipment transmits a measurement report to the base station regarding the determination that the target remote radio head has a sufficiently higher radio link quality than that for the serving remote radio head. Step S902c in FIG. 11 thus corresponds to step S1003 of FIG. 12. In response to receiving the measurement report, the base station in a step S902d determines that the user equipment should handover to the neighbor remote radio head (the target remote radio head) in the secondary carrier.

In a step S903a, the base station transmits control signaling to the user equipment to order the user equipment to handover to the target remote radio head. The control signaling may be denoted as a "handover command." The handover command may include connection information for the secondary carrier link 710. More specifically, the connection information may include at least one of a configuration measurement for the secondary carrier link, mobility control information for the secondary carrier link, radio resource control information for the secondary carrier link, and other suitable parameters. In particular, the radio resource control information for the secondary carrier link may include at least one of a MAC layer configuration for the secondary carrier link, a physical layer configuration in the secondary carrier link, and other suitable information. In that regard, the parameters discussed with regard to step S803a of FIG. 10 may be included in the radio resource control information for the secondary carrier link in step S903a.

In a step S903b, the user equipment transmits a preamble to the remote radio head in the secondary carrier to establish a connection between the user equipment 100 and the target remote radio head. The preamble may be a random access preamble. Alternatively, the preamble may be a pre-assigned dedicated preamble. The pre-assigned access signaling information may be transmitted to the user equipment by the base station in step S903a. In a step S903c, the target remote radio head 500 transmits response signals to the UE in response to the preamble transmitted in step S9036. As a result, the secondary carrier link is established between the user equipment and the target remote radio head 500.

In a step S903d, the user equipment transmits control signaling to the base station to notify the base station that the handover to the target remote radio head has been successfully completed. In some embodiments, the control signaling may be transmitted to the base station via the target remote radio head in the secondary carrier such that step S903d is omitted.

In a step S904a, the base station communicates with the user equipment over the primary carrier link. Step S904a is thus the same as step S901a such that the communication over the primary carrier may be conducted continuously during the call flow of FIG. 11. In a step S904b, the remote radio head communicates with the user equipment in the secondary carrier link. In this fashion, the user equipment communicates with the base station using carrier aggregation operations.

The call flow shown in FIG. 11 may be described in terms of the user equipment operation. The acts by the user equipment comprise making measurements for the secondary carrier link (steps S902a to S902b) using the beacon signals transmitted by the serving remote radio head and neighbor remote radio heads, transmitting a measurement report to the base station (step S902c), and conducting handover to the target remote radio head (steps S903a to S903d).

Figure 13:
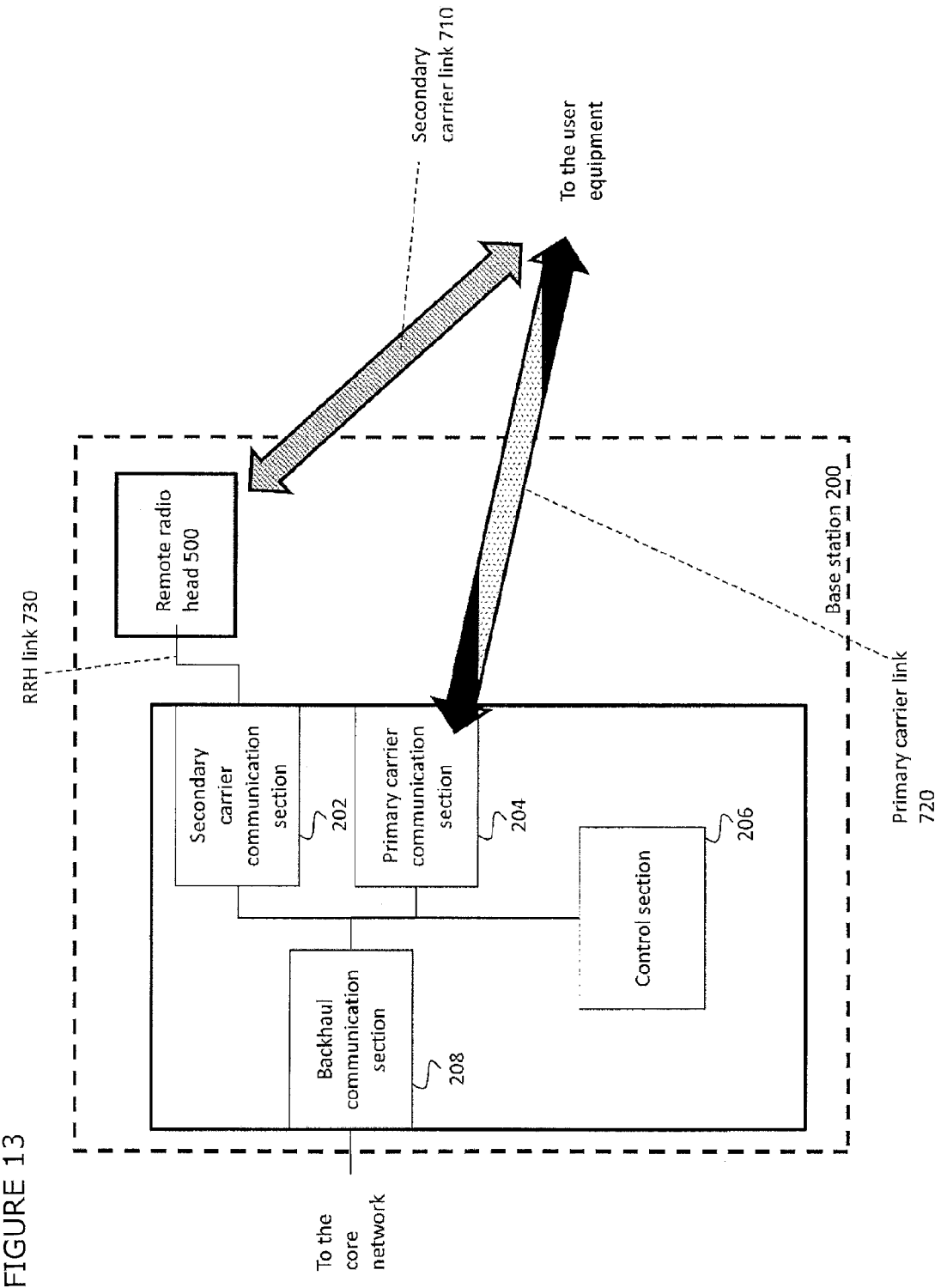
FIG. 13 is a block diagram of a base station configured for either the beacon signal embodiments or the modified PSS/SSS embodiments.
Figure 14:
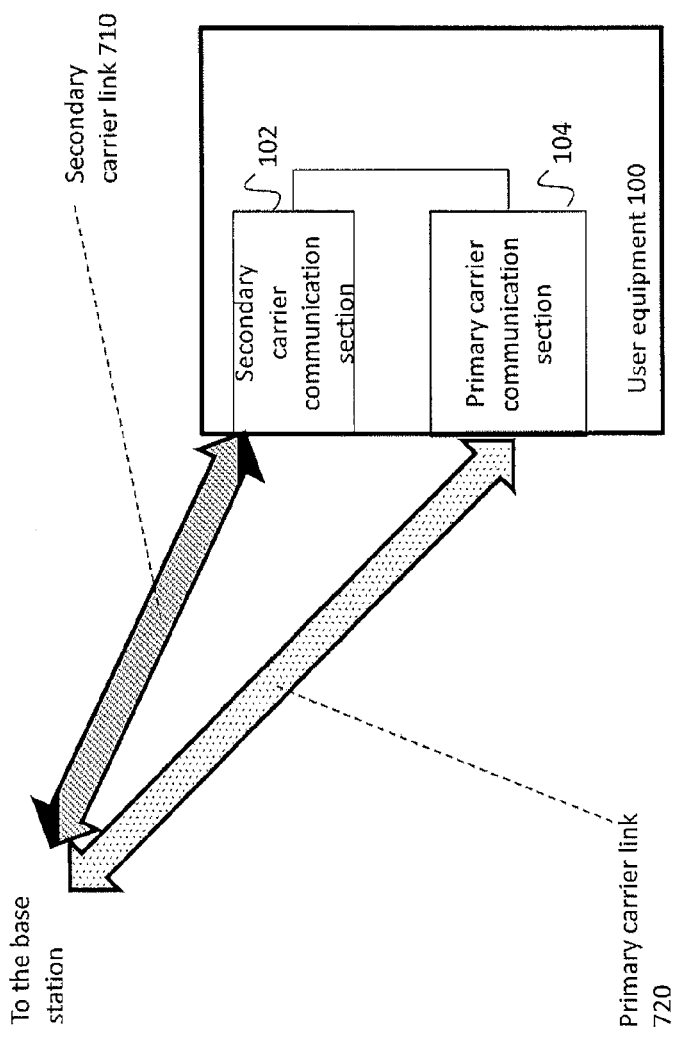
FIG. 14 is a block diagram of the user equipment for either the beacon signal embodiments or the modified PSS/SSS embodiments.

Block diagrams for the base station, the remote radio head, and the user equipment will now be discussed. FIG. 13 illustrates a functional block diagram of the base station whereas FIG. 14 illustrates a functional diagram of the user equipment. The user equipment communicates with the base station utilizing carrier aggregation of the primary carrier and the secondary carrier.

Since the remote radio head may be regarded as an antenna device or a radio device which belongs to the base station, the remote radio head is included as part of the base station in FIG. 13. It will be appreciated, however, that the base station of FIG. 13 is just an embodiment such that alternative configurations may be implemented.

The base station of FIG. 13 includes a secondary carrier communication section 202, a primary carrier communication section 204, a control section 206, a backhaul communication section 208, and a remote radio head 500. Secondary carrier communication section 202, primary carrier communication section 204, control section 206, and backhaul communication section 208 are all operatively coupled to each other. Secondary carrier communication section 202 is also operatively coupled to remote radio head 500.

The secondary carrier communication section communicates with the user equipment utilizing the secondary carrier link via the remote radio head. The secondary carrier communication section controls the transmission of the beacon signals in the secondary carrier. The beacon signals are transmitted to the user equipment via the remote radio head.

Figure 13A:
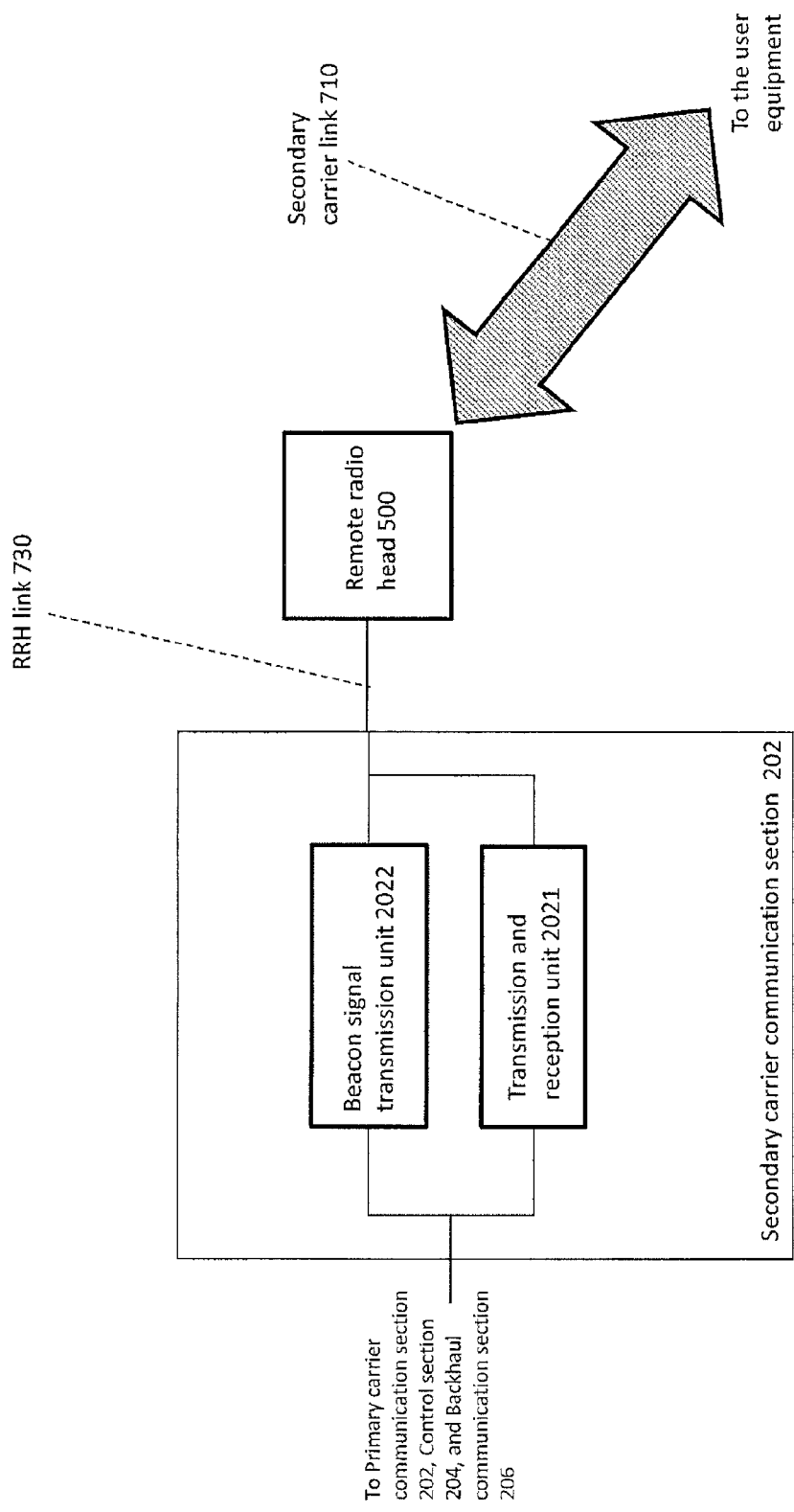
FIG. 13A is a block diagram of the secondary communication unit of FIG. 13 in a beacon signal embodiment.

Additional features for the secondary communication section are shown in FIG. 13A. As seen in this figure, secondary carrier communication section 202 may have a transmission and reception unit 2021 and a beacon signal transmission unit 2022. The transmission and reception unit communicates with the user equipment over the secondary carrier link 710, i.e. it transmits user data and control signaling to the user equipment and vice versa via the remote radio head in the secondary carrier link. The beacon signal transmission unit transmits the beacon signals via the remote radio head in the secondary carrier link. The details of the beacon signals are the same as the ones described above, and therefore are omitted here.

Referring back to FIG. 13, the primary carrier communication section communicates with the user equipment utilizing the primary carrier link. In some other embodiments, a remote radio head may be used in the primary carrier link analogous to secondary carrier link.

Furthermore, the primary carrier communication section transmits control signaling for the secondary carrier link to the user equipment and receives control signaling for the secondary carrier link from the user equipment. This control signaling may be the same as described in FIGS. 10 and 11. A control section 206 controls the primary carrier link and the secondary carrier link. More specifically, the control section conducts the handover procedures and the establishment procedures for the secondary carrier link discussed with regard to FIGS. 10 and 11. Furthermore, control section 206 may conduct other radio link connection control for the secondary carrier link. For example, such other radio link connection control may be at least one of configuring/re-configuring/re-establishing/releasing the secondary carrier link.

A backhaul communication section 208 has a backhaul link which is connected to the core network. The backhaul communication section transmits downlink data to the secondary carrier communication section and to the primary carrier communication section. Similarly, the backhaul communication section receives uplink data from the secondary carrier communication section and from the primary carrier communication section. The downlink data is transmitted from the core network 400, and the uplink data is transmitted to the core network 400.

Referring now to FIG. 14, the user equipment according to this embodiment has a secondary carrier communication section 102 and a primary carrier communication section 104. Secondary carrier communication section 102 and primary carrier communication section 104 are connected to each other. Secondary carrier communication section 102 communicates with the base station via the remote radio head utilizing the secondary carrier link. Furthermore, secondary carrier communication section 102 makes cell search and measurements for the secondary carrier utilizing the beacon signals transmitted by the base station via the remote radio head in the secondary carrier as discussed above.

Figure 14A:
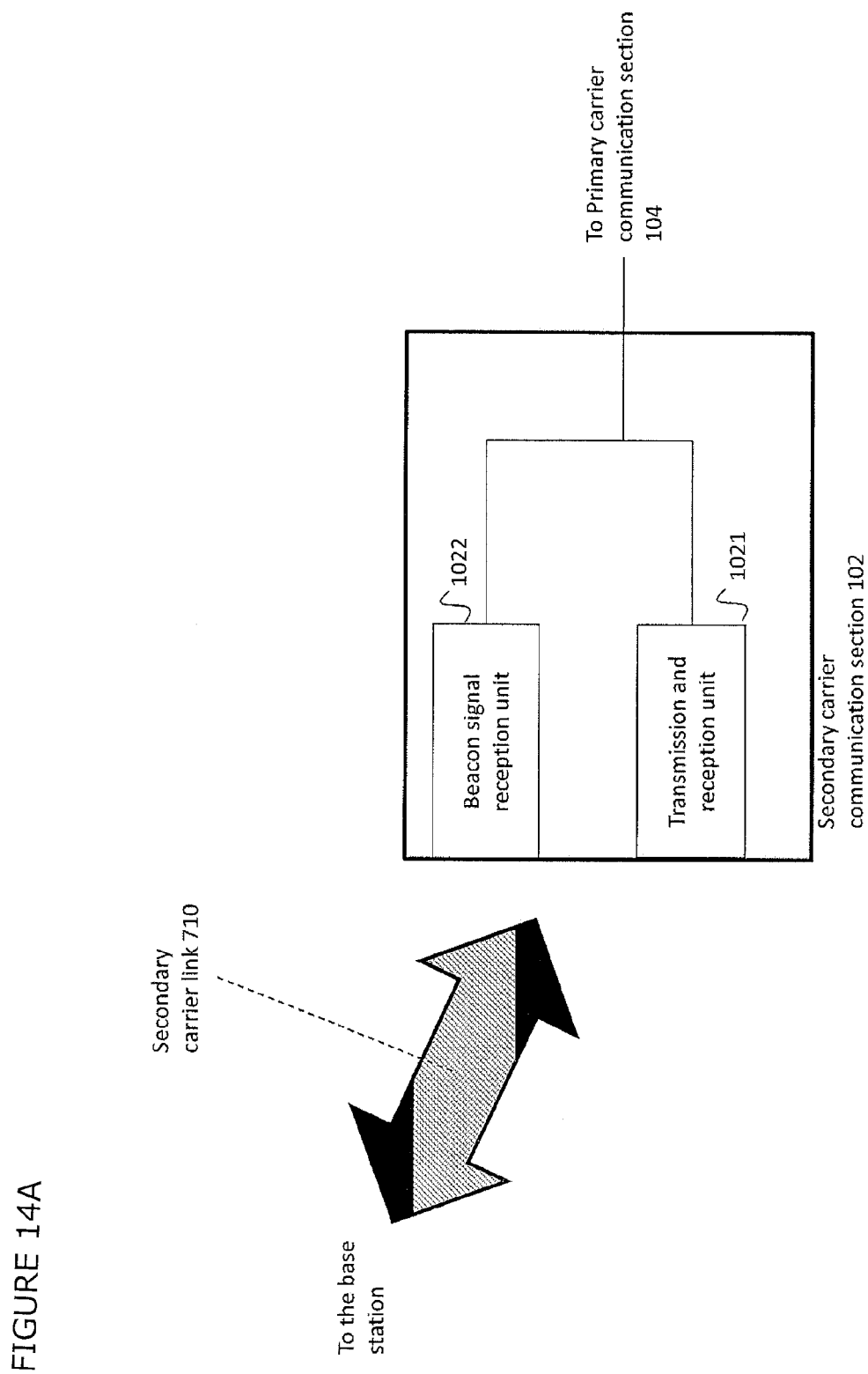
FIG. 14A is a block diagram of the secondary carrier communication section of FIG. 14 in a beacon signal embodiment.
Figure 14B:
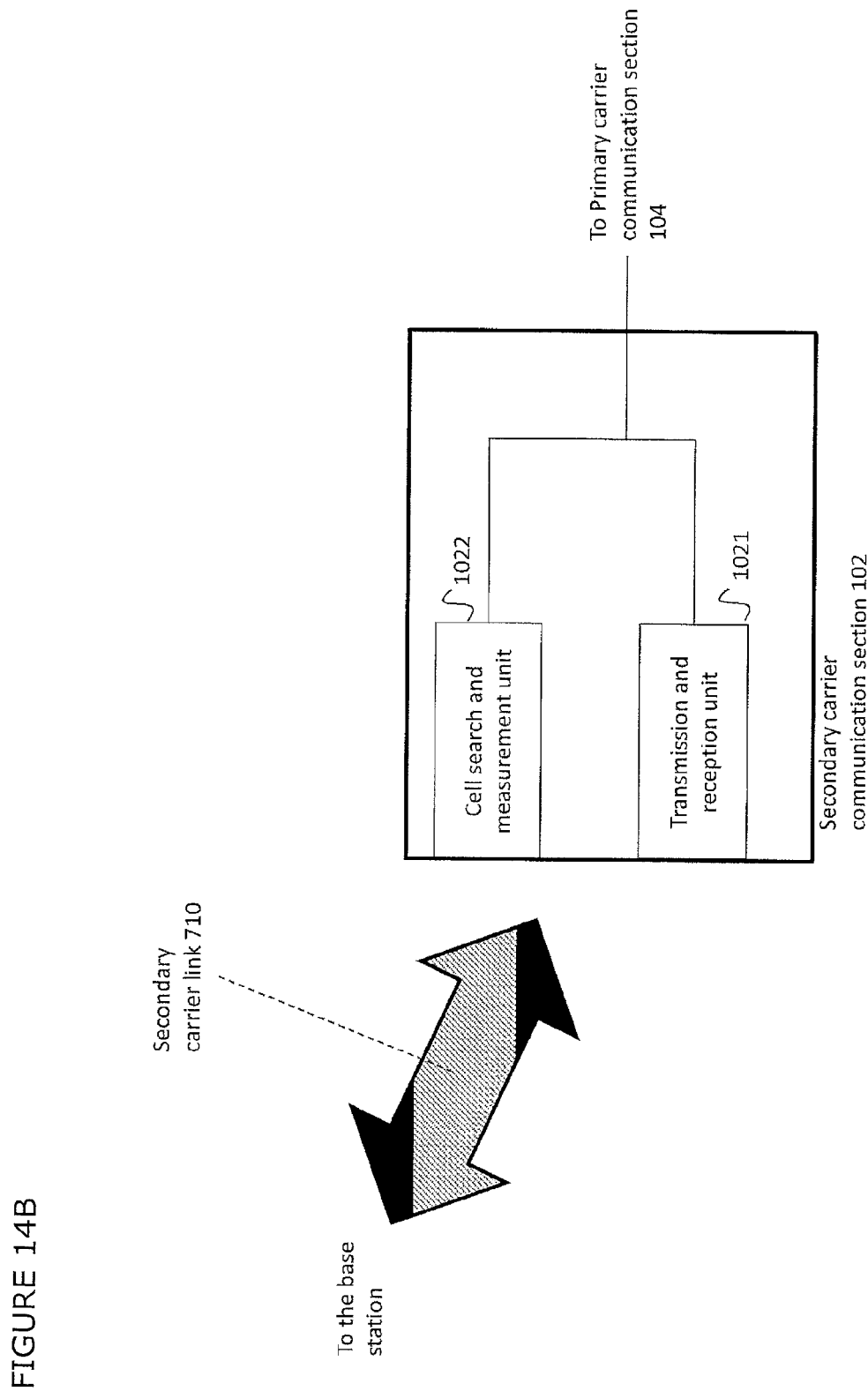
FIG. 14B is a block diagram of the secondary carrier communication section of FIG. 14 in a beacon signal embodiment.

As shown in more detail in FIG. 14A, secondary carrier communication section 102 may have a transmission and reception unit 1021 and a beacon signal reception unit 1022. Transmission and reception unit 1021 communicates with the base station in secondary carrier link 710, i.e. it transmits user data and control signaling to the base station and vice versa in secondary carrier link 710. The beacon signal reception unit 1022 receives the beacon signals in the secondary carrier link 710. More specifically, the beacon signal reception 1022 makes cell search and measurements for the secondary carrier utilizing the beacon signals as discussed above.

The primary carrier communication section 104 communicates with the base station utilizing the primary carrier link 720. Furthermore, the primary carrier communication section 102 receives control signaling for the secondary carrier link 710 from the base station 200 and transmits control signaling for the secondary carrier link 710 to the base station 200. For example, the primary carrier communication section 102 may transmit measurement reports for the secondary carrier link 710 to the base station 200 in the primary carrier link 720. In other examples, the primary carrier communication section 102 may receive a handover command for the secondary carrier link 710, which is transmitted in the primary carrier link 720 as discussed with regard to FIGS. 10 and 11.

In the above examples, a remote radio head is utilized for the secondary carrier but it will be appreciated that other types of network nodes for carrier aggregation operations may be utilized. In particular, any suitable network node that communicates with the user equipment using radio signals may be utilized instead of the remote radio head in alternative embodiments. More specifically, a remote radio head may be replaced with an antenna device or an antenna/radio device in some other embodiments. Furthermore, various kinds of devices may co-exist in the macro cell.

Discovery Using Modified PSS/SSS Signals

As mentioned above, a good trade-off between mobility performance and power consumption is required in the cell search and measurement process for carrier aggregation. This trade-off becomes even more important as the number of secondary carriers that must be searched for increases. One option to achieve a good trade-off between mobility performance and power consumption for the secondary component carrier (the additional carrier type) is:

to synchronize downlink transmission timing for the serving cell and neighbor cells in the secondary component carrier (the additional carrier type)

to change transmission timing of PSS/SSS for each cell in the secondary component carrier more specifically, to shift the transmission timing of PSS/SSS for each cell such that each cell has its own unique PSS/SSS transmission timing within a macro cell to stop transmissions of some other signals in a time frame and frequency resources where PSS/SSS is transmitted in the secondary component carrier Since system information for the secondary component carrier can be transmitted in the primary component carrier using control signaling, the serving cell can notify the user equipment of the transmission timing of PSS/SSS for each cell in the secondary component carrier. Because other signals in the time frame and frequency resource for the modified PSS/SSS are not transmitted, the pilot pollution problems can be avoided for PSS/SSS. As a result, the user equipment can conduct cell search in the secondary component carrier in high signal-to-interference (SIR) conditions, and therefore quickly identify cells with low power consumptions.

In particular, the user equipment can avoid inter-cell interference for the cell identification in the secondary carrier and associated low SIR conditions. As a result, the user equipment can significantly reduce time and battery consumption for the cell identification in the secondary carrier.

From a physical layer procedure point of view, cell search and measurement behaviors for the modified PSS/SSS signals are almost the same as the conventional cell search behaviors. Therefore, there is no degradation for cell identification performance in the secondary component carrier (the additional carrier type).

Figure 3A:
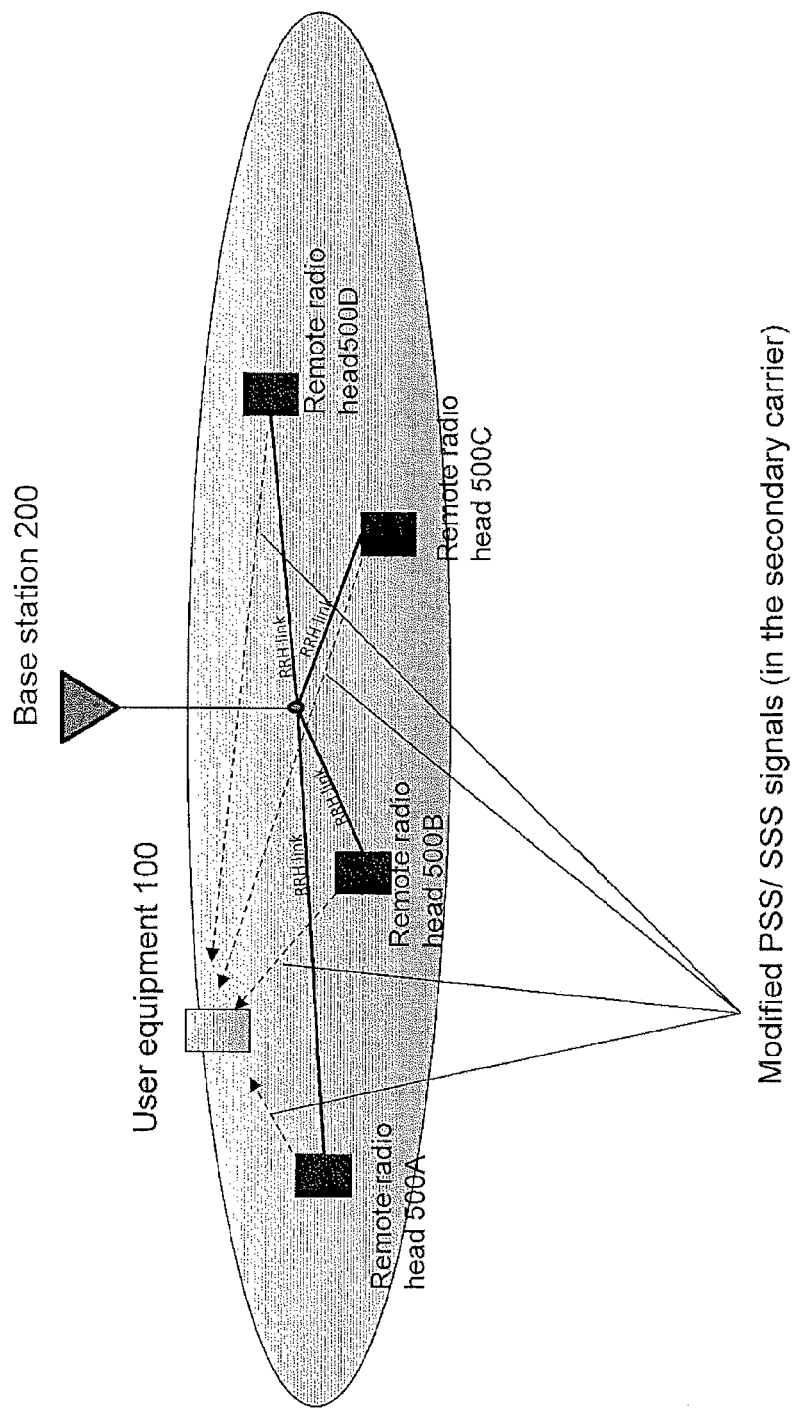
FIG. 3A illustrates a cellular communication network including a plurality of modified-PSS/SSS-transmitting remote radio heads.

System architectures for carrier aggregation using remote radio heads transmitting the modified PSS/SSS signals may be as described above with regard to FIGS. 1-2. In the following examples, the primary carrier is the same as a Release 8 LTE carrier, and the secondary carrier is a new type carrier in terms of cell search and measurements. In particular, the secondary carrier has slightly-modified primary/secondary synchronization signals. The slightly-modified primary/secondary synchronization signals are denoted herein as modified PSS/SSS. Detailed explanation of the modified PSS/SSS is described later. It is noted that the primary carrier may be the same as a Release 9 or Release 10 LTE carrier, instead of a Release 8 LTE carrier. FIG. 3A illustrates a macro cell with four remote radio heads 500A, 500B, 500C, and 500D. Each of these remote radio heads is configured to transmit the modified PSS/SSS signals.

FIG. 15 illustrates an example of the radio resource allocation for the modified PSS/SSS for the remote radio heads of FIG. 3A. The modified PSS/SSS are transmitted in sub-frames #0 and #5 analogously to conventional PSS/SSS signal timing. In FIG. 15, only the sub-frame #5 transmissions are shown but the same timing applies to sub-frame #0 transmissions. In terms of signal sequence, the modified PSS/SSS are the same as the Release 8 PSS/SSS, which is defined in TS 36.211, Section 6.11.1. Similarly, the modified PSS/SSS are transmitted in the same frequency-domain radio resources as the Release 8 PSS/SSS. In particular, the modified PSS/SSS are transmitted in the center 6 resource blocks in a carrier.

However, the time-domain radio resource allocation for the modified PSS/SSS differs for the various remote radio heads. Thus, the time-domain radio resource allocation for the modified PSS/SSS differs from conventional Release 8 PSS/SSS. More details of the time-domain resources are explained below.

As shown in FIG. 15, each remote radio head transmits modified PSS/SSS in its own transmission timing, which is different from the transmission timing for the remaining remote radio heads. In this fashion, the transmission timing of one remote radio head does not collide with that of another remote radio head. As a result, modified PSS/SSS transmitted by each remote radio head do not interfere with one another such that the user equipment can conduct cell search in high SIR conditions.

Figure 16:
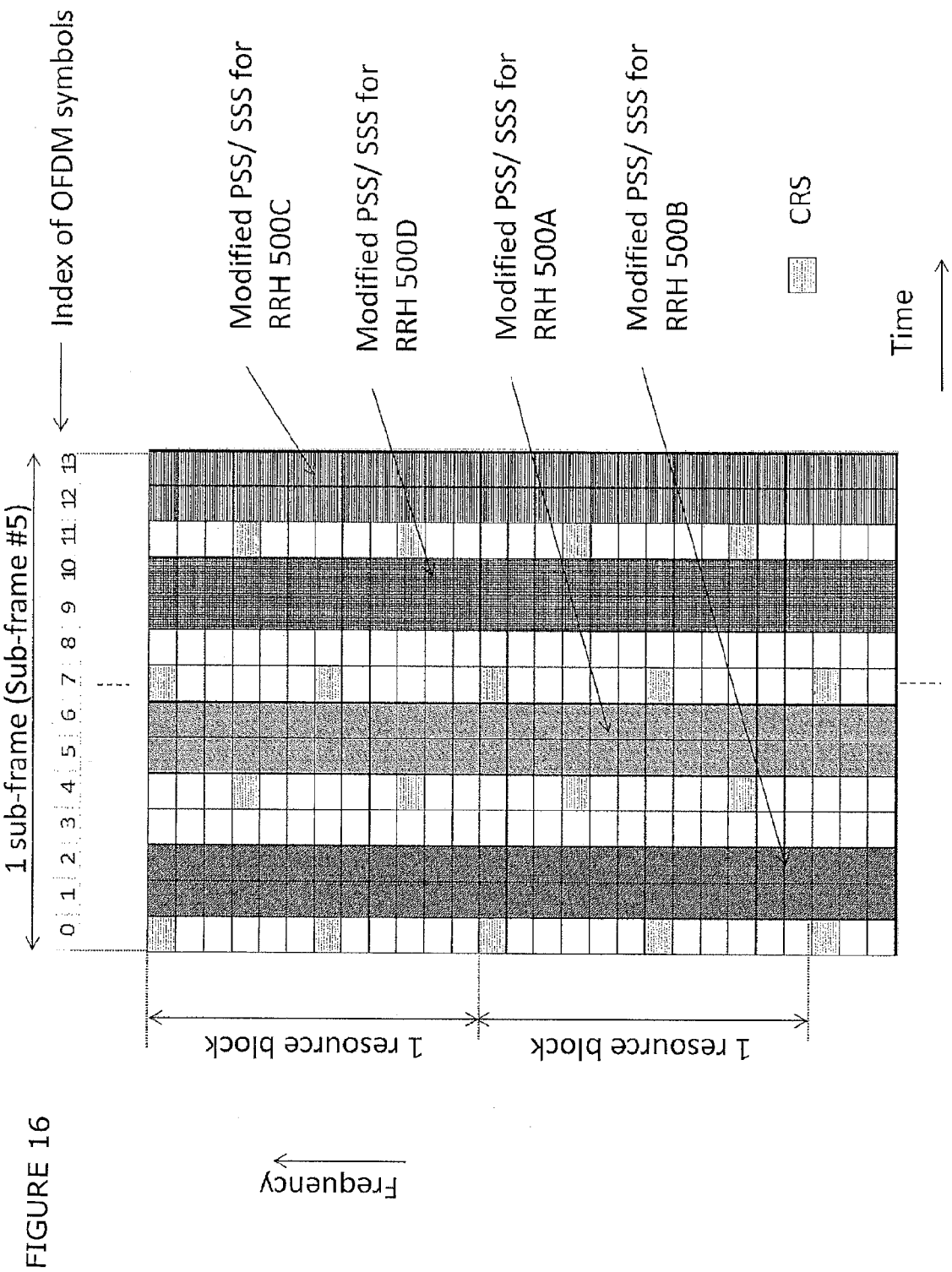
FIG. 16 illustrates the OFDM symbol assignments for various PSS/SSS transmission timings with regard to the center resource blocks.

Rather than require a strictly unique transmission timing for each remote radio head, it may be sufficient that such collisions of the transmission timing of the modified PSS/SSS can be avoided in a best-effort manner. For example, in case that there are four options for the transmission timing of the modified PSS/SSS as shown in FIG. 16, some cells' modified PSS/SSS may collide with other cells' modified PSS/SSS. If a collision with the cell having the strongest power for PSS/SSS is avoided, a high SIR for the received modified PSS/SSS may be achieved despite the possibility of collisions.

Achieving a high SIR in cell search using the modified PSS/SSS is advantageous. For example, cell search is quickly conducted in high SIR conditions whereas cell search in low SIR conditions needs a lot of time. Therefore, the user equipment can reduce the power consumption for the cell search under high SIR conditions. In other words, transmitting the modified PSS/SSS in non-conflicting time-domain resources such that each cell has its own unique PSS/SSS transmission timing can improve received SIR of the modified PSS/SSS at the UE and as a result reduce power consumption.

In contrast, the use of conventional Release 8 PSS/SSS leads to degraded received SIR from the resulting pilot pollution. In such conventional embodiments, the user equipment can limit its cell search to only high-SIR scenarios so as to reduce power consumption but then area in which the user equipment can detect neighbor cells is reduced. Conversely, if the user equipment does not limit its search to high-SIR scenarios, the area in which the user equipment can detect neighbor cells is maintained but the power consumption increases. But the use of the modified PSS/SSS disclosed herein does not degrade SIR. As a result, the user equipment can advantageously detect neighbor cells in a wide area with low power consumption.

The modified PSS/SSS transmission timing for FIGS. 15 and 16 is:

Remote radio head 500A: OFDM symbols #6 and #7
Remote radio head 500B: OFDM symbols #2 and #3
Remote radio head 500C: OFDM symbols #12 and #13
Remote radio head 500D: OFDM symbols #9 and #10

FIG. 16 shows some parts of resource elements in Sub-frame #5 and the center 6 resource blocks in which the modified PSS/SSS are transmitted. The remote radio head 500A transmits the modified PSS/SSS in the same OFDM symbols as for conventional Release 8 PSS/SSS. That is, the remote radio head for a particular cell may transmit the modified PSS/SSS in the same transmission timing as the conventional PSS/SSS. The remote radio heads 500B, 500C, and 500D transmit the modified PSS/SSS in OFDM symbols where cell-specific reference signals (CRS) are not transmitted. As a result, the modified PSS/SSS do not collide with CRS transmissions.

The remote radio heads 500A, 500B, 500C, and 500D transmit the modified PSS/SSS in the sub-frames in which the Release 8 PSS/SSS are transmitted. Furthermore, only CRS are transmitted in resource elements other than the resource elements where the modified PSS/SSS are transmitted. That is, DL signals other than CRS and the modified PSS/SSS are DTXed in resource elements which consist of Sub-frames #0 and #5 and the center 6 resource blocks. As a result, signals transmitted by one remote radio head do not interfere with the modified PSS/SSS transmitted by other remote radio heads. It is noted that in case no CRS are transmitted in the secondary carrier (the additional carrier type), CRS would thus not be transmitted in the resource elements which consist of Sub-frame #0 and #5 and the center 6 resource blocks.

Even though the resource elements other than CRS and the modified PSS/SSS are DTXed in the resource elements which consist of Sub-frame #0/#5 and the center 6 resource blocks, the number of DTXed resource elements is not large and therefore overhead of the DTXed resource elements is not so large.

There is a guard period between OFDM symbols where one remote radio head transmits the modified PSS/SSS and those where another remote radio head transmits the modified PSS/SSS as illustrated in FIG. 16. For example, the OFDM symbols #3, #4, #7, #8, #11 correspond respectively to guard periods. The guard period can avoid interference between the modified PSS/SSS transmitted by remote radio heads, even when the modified PSS/SSS propagation delay for one remote radio head is different from that for another remote radio head. If the propagation-delay difference among cells is large, received power difference among cells is also large, and therefore a relatively small guard period, such as one-OFDM-symbol-length, may be sufficient to avoid inter-cell interference.

The base station may notify the user equipment of transmission timing of the modified PSS/SSS for each remote radio head (each cell in the secondary carrier). As a result, the user equipment can identify DL transmission timing for the secondary carrier by utilizing the transmission timing and reception timing of the modified PSS/SSS. More specifically, the base station may notify the user equipment of OFDM symbols of the modified PSS/SSS for each remote radio head (each cell in the secondary carrier). For example, the base station 200 may notify the user equipment 100 of:

The modified PSS/SSS transmission timing for remote radio head 500A: OFDM symbols #6 and #7
The modified PSS/SSS transmission timing for remote radio head 500B: OFDM symbols #2 and #3
The modified PSS/SSS transmission timing for remote radio head 500C: OFDM symbols #12 and #13
The modified PSS/SSS transmission timing for remote radio head 500D: OFDM symbols #9 and #10

The base station may notify the user equipment of the transmission timing of the modified PSS/SSS for each cell in the second carrier by utilizing the broadcast channel in the primary carrier. The transmission timing of the modified PSS/SSS for each cell in the second carrier may thus be included in system information transmitted in the primary carrier. The transmission timing may be included in a neighbor cell list transmitted in the primary carrier. Alternatively, the base station may notify the user equipment of the transmission timing of the modified PSS/SSS for each cell in the second carrier by utilizing Radio Resource Control (RRC) dedicated signaling in the primary carrier instead of the broadcast channels. The RRC dedicated signaling may be called "signaling radio bearer" or "Dedicated Control Channel (DCCH)".

More specifically, the base station may transmit neighbor cell list shown in FIG. 17. The neighbor cell list may include the transmission timing of the modified PSS/SSS as an information element for each neighbor cell in addition to a physical cell ID and an individual cell offset. It is noted that the transmission timing is identified by the OFDM symbol index in FIG. 17 but other information to identify the transmission timing can also be used in the neighbor cell list. The number of cells identified in the neighbor cell list depends upon the number of remote radio heads deployed in the macro cell.

In the list of FIG. 17, an OFDM symbol index is utilized to identify the transmission timing of the modified PSS/SSS for each cell. However, another index, such as a sub-frame number, a radio frame number, and the like, can also be utilized.

Alternatively, a transmission timing of the modified PSS/SSS for each remote radio head (each cell in the secondary carrier) may be determined by the cell identification number for each cell. As a result, the user equipment can identify the DL transmission timing for the secondary carrier by utilizing the transmission timing determined by the cell identification number and decoding results of the modified PSS/SSS.

More specifically, the transmission timing of the modified PSS/SSS for each remote radio head (each cell in the secondary carrier) can be determined by the table shown in FIG. 18 that is indexed to the cell ID. The resulting look-up table defines a one-to-one mapping of the physical cell ID (cell identification number) and the transmission timing for the modified PSS/SSS in the corresponding remote radio head. The user equipment can identify the transmission timing of each remote radio head (each cell in the secondary carrier) by utilizing the cell identification number, which can be detected in decoding the modified PSS/SSS, and then utilizing the look-up table. The user equipment can thus identify DL radio frame timing of each remote radio head (each cell in the secondary carrier) by utilizing the cell identification number and the look-up table.

In yet another alternative embodiment, the transmission timing of the modified PSS/SSS for each remote radio head (each cell in the secondary carrier) can be determined applying a mathematical function on the cell ID such as the modulo 4 function of FIG. 19. For example, in case that the physical cell ID is 2, the transmission timing of the modified PSS/SSS is OFDM symbols #12 and #13. In this embodiment, the user equipment can identify the transmission timing of each remote radio head (each cell in the secondary carrier) by utilizing the cell identification number, which can be detected in decoding the modified PSS/SSS and then applying the predetermined function on the cell ID.

The base station may notify the user equipment 100 of whether the modified PSS/SSS should be utilized or not. If the modified PSS/SSS should not be utilized, the Release 8 PSS/SSS may be used in the secondary carrier. In this fashion, the remote radio heads are backward compatible with conventional Release 8 LTE UEs.

In some deployment scenarios, the Release 8 PSS/SSS may be more useful than the modified PSS/SSS. For example, in case of a synchronized network, the modified PSS/SSS may not provide any benefits because the DL radio frame timing is not synchronized among cells. That is, the modified PSS/SSS can be utilized in some deployment scenarios, but not in others. Therefore, it is useful to configure the modified PSS/SSS by the above control information, which the base station transmits to the user equipment.

In the above examples, multiple remote radio heads in one base station is considered. However, multiple remote radio heads in more than one base station may be considered in some embodiments, as illustrated in FIG. 9A that was already discussed with regard to the beacon signal embodiment. As discussed previously with regard to FIG. 9A, the use equipment does not link to remote radio heads that are not in the serving base station's macro cell. Nevertheless, the user equipment should not use secondary carrier links that interfere with remote radio heads in the neighboring cell. Thus, the user equipment should conduct cell search and measurements for remote radio heads which belongs to neighbor base station to determine if any of their radio link qualities exceed that of the currently serving remote radio head. If such a link quality is identified, the base station may release the secondary carrier link with the serving remote radio head so that it does not interfere with the remote radio head which belongs to the neighbor base station.

In embodiments where the user equipment 100 makes measurements for remote radio heads which belong to neighbor base stations in the secondary carrier, the base station notifies the user equipment of control information on the transmission timing of the modified PSS/SSS for these remote radio heads using the techniques as described above. For example, the information for the neighboring cell's remote radio heads may be included in a neighbor cell list for the secondary carrier.

Although the call flow of FIG. 10 was previously described with regard to the beacon signal embodiment, this same call flow can apply to a modified PSS/SSS embodiment as follows.

In step S801, the base station 200 communicates with the user equipment 100 in the primary carrier link 720. Thus, in step S801 the base station transmits downlink data to the user equipment and receives uplink data from the user equipment in the primary carrier link as discussed previously.

In steps S802a to S802c, the user equipment makes measurements for the secondary carrier and transmits a measurement report to the base station in the primary carrier link to notify the base station of the identification number of the remote radio head having the best DL radio link quality. More specifically, in step S802a, the base station transmits control signaling to the user equipment in the primary carrier link and orders for the user equipment to make measurements for the secondary carrier so that the user equipment detects a remote radio head with the best radio link quality in the secondary carrier.

The control signaling may include information for the measurements. For example, the control signaling may include at least one of carrier frequency for the secondary carrier, bandwidth of the secondary carrier link, identification number for remote radio heads, information on measurement quantity, information on the modified PSS/SSS transmitted by the remote radio heads and the like. The information on the modified PSS/SSS includes the transmission timing of the modified PSS/SSS as discussed above.

Furthermore, the modified PSS/SSS information may include information on whether or not the modified PSS/SSS should be utilized. That is, the control signaling in the step S802a may include an indicator whether or not a carrier (secondary carrier) in which the modified PSS/SSS is transmitted is available in the base station's macro cell.

In addition, rules for sending measurement reports to the base station may also be included in the information for the measurements. The rules may be criteria such as specified for Release 8, Release 9, or Release 10 LTE. These criteria include Event A1, A2, A3, A4, A5, A6 and the like. The rules are specified in TS 36.331, V10.2.0, 2011-06. Threshold value, a Layer-3 filtering coefficient, or a time-to-trigger may also be included in the information for the measurements.

Furthermore, control signaling for cell selection/reselection may also be included in the information for the measurements. That is, control signaling for idle-mode measurements may also be included in the information for the measurements. The control signaling may be transmitted in the dedicated control signaling or in the broadcast information in the primary carrier. The control signaling may be transmitted in the step S801, instead of the step S802a.

In step S802b, the user equipment 100 makes measurements for the DL radio link quality in the second carrier by utilizing the modified PSS/SSS and the reference signals in the secondary carrier. After identifying cells in the secondary carrier, the user equipment measures the DL radio link quality by utilizing the reference signals. The reference signals may be cell-specific reference signals (CRS), channel state information reference signals (CSI-RS), or other reference signals. The DL radio link quality may be the received power of the reference signals. Alternatively, the DL radio link quality may be the received quality of the reference signals. Alternatively, the DL radio link quality may be the received signal-to-interference ratio of the reference signals. Finally, the user equipment may make measurements for the DL radio link quality by utilizing the modified PSS/SSS.

In step S802c, the user equipment transmits to the base station a measurement report in the primary carrier link to notify the base station of the identification number for the remote radio head having the best DL radio link quality. The remaining steps in FIG. 10 are as described previously with regard to the beacon signal embodiment. The steps carried out by the network components for the modified PSS/SSS embodiment are also analogous to the beacon signal operations. The difference is that the modified PSS/SSS signals are transmitted and decoded instead of the beacon signals.

Handoff to a target remote radio head from a source remote radio head in a PSS/SSS embodiment is also analogous to the handoff operation already described with regard to FIGS. 11 and 12 for the beacon signal embodiment. The previous description for the beacon signal embodiment may thus be used for the modified PSS/SSS signal embodiment by the replacement of the beacon signal by the modified PSS/SSS signals.

Figure 13B:
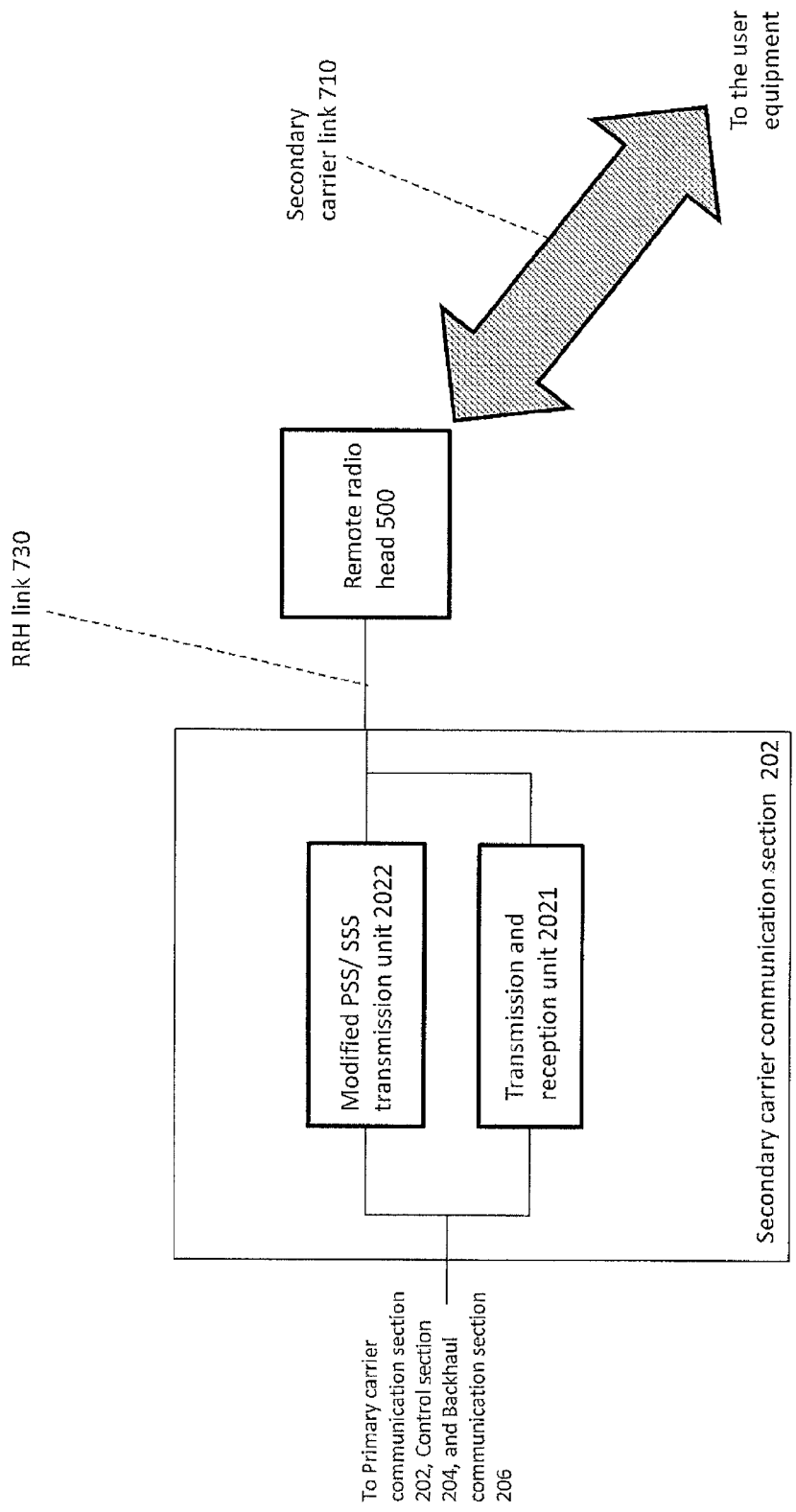
FIG. 13B is a block diagram of the secondary communication unit of FIG. 13 in a modified PSS/SS embodiment.

The base station and user equipment configuration as discussed with regard to FIGS. 13 and 14 is also analogous to a modified PSS/SSS configuration. With regard to the base station/remote radio head, the difference is as shown in FIG. 13B for secondary communication section 202, which may have a transmission and reception unit 2021 and a modified PSS/SSS transmission unit 2022. The transmission and reception unit 2021 communicates with the user equipment in the secondary carrier link, i.e. it transmits user data and control signaling to the user equipment and vice versa via the remote radio head in the secondary carrier link. Modified PSS/SSS transmission unit 2022 transmits the modified PSS/SSS signals via the remote radio head in the secondary carrier link.

As described above, the transmission timing of the modified PSS/SSS is different for each cell in the secondary carrier. Modified PSS/SSS transmission unit 2022 thus transmits the modified PSS/SSS signals according to this individual cell transmission timing assignment. For example, if the transmission timing of the modified PSS/SSS is determined by the physical cell ID, modified PSS/SSS transmission unit 2022 transmits the modified PSS/SSS at the transmission timing as determined from the physical cell ID.

Alternatively, modified PSS/SSS transmission unit 2022 may decide the transmission timing of the modified PSS/SSS so that the transmission timing of the modified PSS/SSS does not collide with the transmission timing of the modified PSS/SSS for neighbor cells in the secondary carrier. In such an embodiment, modified PSS/SSS transmission unit 2022 may obtain information on the transmission timing of the PSS/SSS for the neighbor cells. The information can be exchanged in the base station or with neighbor base stations. If the information is exchanged with the neighbor base stations, such exchange may be conducted via secondary carrier communication section 202, or the backhaul communication section 208 and the core network.

The user equipment configuration is analogous to that already discussed with regard to the beacon signal embodiment illustrated in FIGS. 14 and 14A. However, in the modified PSS/SSS configuration, secondary carrier communication section 102 of FIG. 14 makes cell search for the secondary carrier by utilizing the modified PSS/SSS and makes measurements for the secondary carrier by utilizing the reference signals. As already discussed for FIG. 14A, secondary carrier communication section 102 may have a transmission and reception unit 1021 and a cell search and measurement unit 1022. In a modified PSS/SSS embodiment, cell search and measurement unit 1022 receives the modified PSS/SSS in the secondary carrier link. More specifically, cell search and measurement unit 1022 makes a cell search for the secondary carrier by utilizing the modified PSS/SSS. The cell search and measurement unit 1022 then makes measurements of the DL radio link quality by utilizing the reference signals.

As described above, the transmission timing of the modified PSS/SSS is different among each cell in the secondary carrier. Therefore, the cell search and measurement unit 1022 for a modified PSS/SSS embodiment makes a cell search based on the received modified PSS/SSS and the control information on the transmission timing of the modified PSS/SSS. In such an embodiment, cell search and measurement unit 1022 identifies DL radio frame timing for each cell by reception timing of the modified PSS/SSS and the information on the transmission timing of the modified PSS/SSS.

For example, if the transmission timing of the modified PSS/SSS is determined by the physical cell ID, cell search and measurement unit 1022 may identify the DL radio frame timing for each cell by the reception timing of the modified PSS/SSS and the transmission timing of the modified PSS/SSS as determined by the physical cell ID. The physical cell ID can be detected in decoding the modified PSS/SSS.

Alternatively, if the base station notifies the user equipment of the transmission timing of the modified PSS/SSS by utilizing control information, cell search and measurement unit 1022 identifies the DL radio frame timing for each cell by reception timing of the modified PSS/SSS and the transmission timing of the modified PSS/SS which is indicated in the control information. For example, the transmission timing may be indicated as illustrated in FIG. 17.

If the transmission timing is indicated as shown in the look-up table embodiment of FIG. 18, cell search and measurement unit 1022 identifies the DL radio frame timing for each cell by the reception timing of the modified PSS/SSS and the transmission timing of the modified PSS/SSS as determined by the look-up table and the physical cell ID. The physical cell ID can be detected in decoding the modified PSS/SSS.

As also discussed with regard to the beacon signal embodiment, the modified PSS/SSS technique is not limited to remote radio head embodiments. Instead, the modified PSS/SSS technique may be applied to any suitable network node that communicates with the user equipment using a secondary carrier.

Regardless of whether a beacon signal embodiment or a modified PSS/SSS embodiment is implemented, the functions for the base station, the user equipment, and the remote radio head may be implemented by hardware, by a software module executed by a processor, or may further be implemented by a combination of both hardware and software. The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the base station apparatus, the user equipment, and the remote radio head. As a discrete component, such a storing medium and processor may be arranged, in the base station, the user equipment, and the remote radio head.

We claim:

1. A method of discovering small cells using a secondary carrier, comprising:
    receiving at a user equipment first control signaling from a base station over a primary carrier link, wherein the first control signaling identifies the radio resource allocation for a plurality of beacon signals from the small cells carried over the secondary carrier;
    receiving at the user equipment the beacon signals in the identified radio resources, wherein the user equipment receives the plurality of beacon signals with reference to a timing information in the primary carrier,
    the plurality of beacon signals comprising a first beacon signal, identified by the timing information, from a network node in a first small cell;
    transmitting from the user equipment to the base station an identification of the first small cell responsive to receipt of the first beacon signal; and
    receiving at the user equipment second control signaling from the base station over the primary carrier, wherein the second control signaling commands the user equipment to establish a secondary carrier link with the network node in the first small cell.

2. The method of claim 1, wherein the second control signaling is responsive to measuring a best signal quality for a beacon signal received from the network node in the first small cell.

3. The method of claim 1, further comprising:
    at the user equipment, receiving first data over the primary carrier link; and
    at the user equipment, receiving second data over the secondary carrier link.

4. The method of claim 3, further comprising:
    subsequent to the receipt of the second data, receiving additional beacon signals at the user equipment;
    transmitting from the user equipment to the base station a second identification of a second small cell that transmitted a beacon signal having the current best received quality, wherein the second small cell includes a target remote radio head;
    receiving third control signaling at the user equipment from the base station, wherein the third control signaling commands the user equipment to release the secondary carrier link with the source remote radio head and to establish a secondary carrier link with the target remote radio head and receiving at the user equipment third data over the secondary carrier link with the target remote radio head.

5. The method of claim 2, wherein the beacon signal from the first small cell is coded orthogonally with respect to beacon signals from the remaining small cells.

6. The method of claim 5, wherein the beacon signals are orthogonal division frequency multiplexed (OFDM) signals.

7. The method of claim 5, wherein the beacon signals occupy resource elements that are not used for common reference signals.

8. The method of claim 5, wherein the beacon signals include a cyclic prefix of sufficient length to accommodate propagation delays.

9. The method of claim 5, wherein each beacon signal includes a unique code.

10. The method of claim 9, wherein each unique code is a Constant Amplitude Zero Autocorrelation (CAZAC) code.

11. A method of discovering small cells using a secondary carrier, comprising:
transmitting from a base station to a user equipment first control signaling over a primary carrier link to identify to the user equipment radio resource allocation for a plurality of beacon signals transmitted by the small cells over the secondary carrier;
receiving, by the user equipment, the plurality of beacon signals in the identified radio resources, wherein the user equipment receives the plurality of beacon signals with reference to a timing information in the primary carrier link, wherein the plurality of beacon signals comprises a first beacon signal, identified by the timing information, from a network node in a first one of the small cells;
receiving from the user equipment a first measurement report identifying the first one of the small cells;
transmitting from the base station to the user equipment second control signaling over the primary carrier link to command the user equipment to establish a secondary carrier link with a network node in the first small cell; and
transmitting from the base station to the user equipment first data over the primary carrier link and second data over the established secondary carrier link through the network node.

12. The method of claim 11, wherein the network node is a source remote radio head.

13. The method of claim 11, wherein the first measurement report identifies the first small cell responsive to a signal quality for a beacon signal transmitted from the first small cell.

14. The method of claim 13, further comprising:
subsequent to the transmission of the second data, receiving from the user equipment a second measurement report identifying a second one of the small cells, wherein the second small cell has a beacon signal having a current best received signal quality at the user equipment; and
transmitting from the base station to the user equipment third control signaling to command the user equipment to release the secondary carrier link with the source remote radio head and to establish a secondary carrier link with a target remote radio head associated with the second small cell.

15. A user equipment, comprising:
a primary communication section configured to communicate with a base station over a primary carrier link; and
a secondary communication section configured to communicate over a secondary carrier link,
wherein the primary communication section is further configured to receive first control signaling from the base station to identify a radio resource allocation for a plurality of beacon signals transmitted by at least one small cell,
wherein the secondary communication section is further configured to establish the secondary carrier link with a network node associated with a small cell;
wherein the secondary communication section further comprises a beacon signal reception unit to measure received qualities for the plurality of beacon signals; and a transmission and reception unit configured to transmit to and receive user data and control signaling from the base station;
wherein the beacon signal reception unit is further configured to measure the received qualities for the plurality beacon of signals with reference to a timing information identified by the primary communication section in the primary carrier link, and
wherein the plurality of beacon signals comprises a first beacon signal, identified by the timing information, from the network node.

16. The user equipment of claim 15, wherein the network node is a remote radio head.

17. A base station, comprising:
a primary communication section configured to transmit to and to receive from a user equipment first user plane data and control signaling over a primary carrier link;
a secondary communication section configured to transmit to and to receive from the user equipment second user plane and control signaling over a secondary carrier link,
wherein the secondary communication section is further configured to transmit at least one beacon signal to the user equipment, each beacon signal corresponding to its own small cell within a macro cell controlled by the base station; and
a control unit configured to control the establishment of the primary carrier link with a first one of the small cells,
wherein the primary communication section is further configured to transmit first control signaling to the user equipment over the primary carrier link to identify a radio resource allocation and a timing information for each of the beacon signals.

18. The base station of claim 17, wherein the control unit is further configured to control the release of the primary carrier link with the first small cell responsive to a receipt at the primary, communication section from the user equipment over the primary career link of an indication that the first small cell no longer has the best received beacon signal quality at the user equipment.

19. The base station of claim 18, wherein the control unit is further configured to control the establishment of a primary carrier link with a second small cell having a current best received beacon signal quality at the user equipment.

20. A method of discovering small cells using a secondary carrier, comprising:
receiving at a user equipment first control signaling from a base station over a primary carrier link, wherein the first control signaling identifies the OFDM symbol index for modified primary synchronization signals (PSS) and secondary synchronization signals (SSS) transmitted from at least one small cell over the secondary carrier such that each small cell has its own unique OFDM symbol index;

receiving at the user equipment the modified PSS/SSS according to their OFDM indices to determine a cell identification (ID) for each small cell and to determine a DL radio frame timing for each small cell;

responsive to the determined DL radio frame timing for each small cell, measuring a received reference signal quality at the user equipment from each small cell;

transmitting from the user equipment to the base station the cell ID of a first one of the small cells, wherein the first small cell corresponds to a best one of the measured received reference signal qualities; and receiving at the user equipment second control signaling from the base station over the primary carrier, wherein the second control signaling commands the user equipment to establish a secondary carrier link with the first small cell.

21. The method of claim 20, wherein the user equipment establishes the secondary carrier link with a source remote radio head in the first small cell.

22. The method of claim 21, further comprising:
at the user equipment, receiving first data over the primary carrier link; and
at the user equipment, receiving second data over the secondary carrier link.

23. The method of claim 20, wherein the user equipment receives the first control signaling in a broadcast message from the base station.

24. The method of claim 20, wherein the user equipment receives the first control signaling in a Radio Resource Control (RRC) dedicated signaling in the primary carrier.

25. The method of claim 22, further comprising:
subsequent to the receipt of the second data, receiving at the user equipment the modified PSS/SSS according to their OFDM indices to again determine a cell identification (ID) for each small cell and to again determine a DL radio frame timing for each small cell;

responsive to the again determined DL radio frame timing for each small cell, measuring a current received reference signal quality at the user equipment from each small cell;

transmitting from the user equipment to the base station the cell ID of a second one of small cells, wherein the second small cell corresponds to a best one of the measured current received reference signal qualities; and receiving at the user equipment second control signaling from the base station over the primary carrier, wherein the second control signaling commands the user equipment to establish release the secondary carrier link with the first small cell and to establish a secondary carrier link with the second small cell.

26. A method of discovering small cells using a secondary carrier, comprising:

transmitting from a base station to a user equipment first control signaling over a primary carrier link, wherein the first control signaling identifies the OFDM symbol index for modified primary synchronization signals (PSS) and secondary synchronization signals (SSS) transmitted from at least one small cell over the secondary carrier such that each small cell has its own unique OFDM symbol index;

receiving from the user equipment a first measurement report identifying a first one of the small cells, wherein the first small cell has a best received reference signal quality at the user equipment;

transmitting from the base station to the user equipment second control signaling over the primary carrier link to command the user equipment to establish a secondary carrier link with a network node in the first small cell; and transmitting from the base station to the user equipment first data over the primary carrier link and second data over the established secondary carrier link via the network node.

* * * * *